United States Patent
Gunnam

(10) Patent No.: US 10,452,533 B2
(45) Date of Patent: Oct. 22, 2019

(54) ACCESS NETWORK FOR ADDRESS MAPPING IN NON-VOLATILE MEMORIES

(71) Applicant: Western Digital Technologies, Inc., Irvine, CA (US)

(72) Inventor: Kiran Kumar Gunnam, Milpitas, CA (US)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 180 days.

(21) Appl. No.: 15/449,612

(22) Filed: Mar. 3, 2017

(65) Prior Publication Data
US 2017/0177470 A1 Jun. 22, 2017

Related U.S. Application Data

(63) Continuation-in-part of application No. 14/967,169, filed on Dec. 11, 2015, now Pat. No. 9,921,969.
(Continued)

(51) Int. Cl.
*G06F 12/02* (2006.01)
*G06F 12/06* (2006.01)
(Continued)

(52) U.S. Cl.
CPC ...... *G06F 12/0246* (2013.01); *G06F 12/0607* (2013.01); *G06F 7/768* (2013.01);
(Continued)

(58) Field of Classification Search
CPC ............... G06F 12/0246; G06F 12/10; G06F 2212/214; G06F 2212/7201;
(Continued)

(56) References Cited

U.S. PATENT DOCUMENTS 5,838,893 A   11/1998   Douceur
5,937,435 A   8/1999   Dobbek et al.
(Continued)

FOREIGN PATENT DOCUMENTS

CN   103546397 A   1/2014
CN   104731713 A   6/2015

OTHER PUBLICATIONS

Chen et al, "Energy and Memory Efficient Mapping of Bitonic Sorting on FPGA" abstract, FPGA '15 Proceedings of the 2015 ACM/SIGDA Intl Symposium on Field-Programmable Gate Arrays, pp. 240-249; ISBN 978-1-4503-3315-3, DOI 10.1145/2684746. 2689068; http://dl.acm.org/citation.cfm?id=2689068.
(Continued)

*Primary Examiner* — Masud K Khan
(74) *Attorney, Agent, or Firm* — Loza & Loza, LLP; Gabriel Fitch

(57) ABSTRACT

Systems and methods for determining a physical block address (PBA) of a non-volatile memory (NVM) to enable a data access of a corresponding logical block address (LBA) are described. One such method includes generating a first physical block address (PBA) candidate from a LBA using a first function; generating a second physical block address (PBA) candidate from the LBA using a second function; and selecting either the first PBA candidate or the second PBA candidate for the data access based on information related to a background swap of data stored at the first PBA candidate and a background swap of data stored at the second PBA candidate.

26 Claims, 24 Drawing Sheets

Related U.S. Application Data

(60) Provisional application No. 62/360,916, filed on Jul. 11, 2016, provisional application No. 62/192,509, filed on Jul. 14, 2015.

(51) Int. Cl.
*G06F 12/10* (2016.01)
*G06F 7/76* (2006.01)
*G06F 12/1072* (2016.01)

(52) U.S. Cl.
CPC .......... *G06F 12/10* (2013.01); *G06F 12/1072* (2013.01); *G06F 2212/1016* (2013.01); *G06F 2212/1044* (2013.01); *G06F 2212/152* (2013.01); *G06F 2212/214* (2013.01); *G06F 2212/7201* (2013.01); *G06F 2212/7211* (2013.01)

(58) Field of Classification Search
CPC ......... G06F 2212/7211; G06F 12/1072; G06F 7/768; G06F 2212/1016; G06F 2212/1044; G06F 2212/152
See application file for complete search history.

(56) References Cited

U.S. PATENT DOCUMENTS

| | | | |
|---|---|---|---|
| 5,943,283 A * | 8/1999 | Wong | G06F 12/1408 365/221 |
| 6,345,001 B1 | 2/2002 | Mokhlesi | |
| 6,430,672 B1 | 8/2002 | Dhong et al. | |
| 6,850,443 B2 | 2/2005 | Lofgren et al. | |
| 7,711,923 B2 | 5/2010 | Rogers et al. | |
| 7,911,364 B1 | 3/2011 | Zhang et al. | |
| 8,266,367 B2 | 9/2012 | Yu et al. | |
| 8,341,332 B2 | 12/2012 | Ma et al. | |
| 8,375,160 B2 | 2/2013 | Nakanishi et al. | |
| 8,522,072 B2 | 8/2013 | Huang | |
| 8,660,608 B2 | 2/2014 | Schell et al. | |
| 8,667,248 B1 | 3/2014 | Neppalli | |
| 8,719,489 B2 | 5/2014 | Tzeng | |
| 8,745,357 B2 | 6/2014 | Tucek et al. | |
| 8,782,320 B2 | 7/2014 | Gunnam | |
| 8,806,171 B2 | 8/2014 | Seong et al. | |
| 8,862,810 B2 | 10/2014 | Lee et al. | |
| 8,977,894 B2 | 3/2015 | Eleftheriou et al. | |
| 9,104,555 B2 | 8/2015 | Liebowitz et al. | |
| 9,158,672 B1 | 10/2015 | Zheng et al. | |
| 9,170,933 B2 | 10/2015 | Cideciyan et al. | |
| 9,189,420 B2 | 11/2015 | Yu et al. | |
| 9,268,686 B2 | 2/2016 | Linkewitsch | |
| 2005/0172065 A1 | 8/2005 | Keays | |
| 2005/0188149 A1 | 8/2005 | Kaler | |
| 2005/0258863 A1 | 11/2005 | Chang et al. | |
| 2006/0282610 A1 | 12/2006 | Dariel et al. | |
| 2007/0208904 A1 * | 9/2007 | Hsieh | G06F 12/0246 711/103 |
| 2007/0255889 A1 | 11/2007 | Yogev et al. | |
| 2007/0294490 A1 * | 12/2007 | Freitas | G06F 12/0246 711/154 |
| 2009/0327602 A1 * | 12/2009 | Moore | G06F 3/0616 711/114 |
| 2010/0070735 A1 | 3/2010 | Chen et al. | |
| 2010/0088461 A1 | 4/2010 | Yang et al. | |
| 2010/0115175 A9 | 5/2010 | Zhuang et al. | |
| 2010/0125696 A1 | 5/2010 | Kumar et al. | |
| 2012/0099670 A1 | 4/2012 | Gunnam | |
| 2012/0233381 A1 | 9/2012 | Tucek et al. | |
| 2013/0007380 A1 | 1/2013 | Seekins et al. | |
| 2013/0166827 A1 | 6/2013 | Cideciyan et al. | |
| 2014/0052899 A1 | 2/2014 | Nan | |
| 2014/0189284 A1 | 7/2014 | Hyuseinova et al. | |
| 2014/0237160 A1 | 8/2014 | Dong | |
| 2014/0337564 A1 | 11/2014 | Varanasi | |
| 2015/0012694 A1 | 1/2015 | Edelhaeuser | |
| 2015/0134930 A1 | 5/2015 | Huang et al. | |
| 2016/0246712 A1 * | 8/2016 | Vucinic | G06F 12/0692 |
| 2016/0283549 A1 | 9/2016 | Hux | |

OTHER PUBLICATIONS

Xinhua et al, "A Wear-Leveling Algorithm for Nandflash in Embedded System" abstract, Embedded Computing, 2008, SEC '08. Fifth IEEE Intl Symposium on, Beijing, pp. 260-265, doi 10.1109/SEC.2008.54; http://ieeexplore.ieee.org/stamp/stamp.jsp?tp=&arnumber=4690759&isnumber=4690708.

HGST, Inc. "FlashMAX PCIe" Data Sheet; https://www.hgst.com/sites/default/files/resources/FlashMAX-PCIe-SSD-DS.pdf; 2015; 2 pages.

Teshome et al., "A Tri-Pool Dynamic Wear-Leveling Algorithm for Large Scale Flash Memory Storage Systems", http://ieeexplore.ieee.org/xpl/login.jsp?tp=&arnumber=5772379; downloaded May 19, 2015; 2 pages.

Yun et al, "Dynamic Wear Leveling for Phase-Change Memories With Endurance Variations"; IEEE Transactions on Very Large Scale Integration (VLSI) Systems; vol. 23, Issue 9; Sep. 2014; pp. 1604-1615; doi 10.1109/TVLSI.2014.2350073; http://ieeexplore.ieee.org/xpl/articleDetails.jsp?arnumber=6893041.

* cited by examiner

Example: Global Mapping
with Bit Inverse of MSB 1 (0001) → 9 (1001)
2 (0010) → 10 (1010)
3 (0011) → 11 (1011)
4 (0100) → 12 (1100)
5 (0101) → 13 (1101)
6 (0110) → 14 (1110)
7 (0111) → 15 (1111)
8 (1000) → 16 (0000)
9 (1001) → 1 (0001)
10 (1010) → 2 (0010)
11 (1011) → 3 (0011)
12 (1100) → 4 (0100)
13 (1101) → 5 (0101)
14 (1110) → 6 (0110)
15 (1111) → 7 (0111)
16 (0000) → 8 (1000)

*FIG. 18*

Example: Local Interleaving with Permutation
[x2 x1 x0] → [x2 x0 x1]

ACCESS NETWORK FOR ADDRESS MAPPING IN NON-VOLATILE MEMORIES

CROSS-REFERENCE TO RELATED APPLICATION(S)

This application claims priority to and the benefit of U.S. Provisional Application No. 62/360,916, filed on Jul. 11, 2016, and entitled, "GENERATION OF RANDOM ADDRESS MAPPING IN NON-VOLATILE MEMORIES USING LOCAL AND GLOBAL INTERLEAVING", and is a continuation in part of U.S. patent application Ser. No. 14/967,169, filed on Dec. 11, 2015, and entitled, "GENERATION OF RANDOM ADDRESS MAPPING IN NON-VOLATILE MEMORIES USING LOCAL AND GLOBAL INTERLEAVING", which claims priority to and the benefit of U.S. Provisional Application No. 62/192,509, filed on Jul. 14, 2015, and entitled, "SYSTEMS AND METHODS FOR PROVIDING DYNAMIC WEAR LEVELING IN NON-VOLATILE MEMORIES", the entire content of each application referenced above is incorporated herein by reference.

FIELD

Aspects of the disclosure relate generally to mapping memory addresses, and more specifically, to address mapping in non-volatile memories.

BACKGROUND

In a variety of consumer electronics, solid state drives incorporating non-volatile memories (NVMs) are frequently replacing or supplementing conventional rotating hard disk drives for mass storage. These non-volatile memories may include one or more flash memory devices, the flash memory devices may be logically divided into blocks, and each of the blocks may be further logically divided into addressable pages. These addressable pages may be any of a variety of sizes (e.g., 512 Bytes, 1 Kilobytes, 2 Kilobytes, 4 Kilobytes), which may or may not match the logical block address sizes used by a host computing device.

During a write operation, data may be written to the individual addressable pages in a block of a flash memory device. However, in order to erase or rewrite a page, an entire block must typically be erased. Of course, different blocks in each flash memory device may be erased more or less frequently depending upon the data stored therein. Thus, since the lifetime of storage cells of a flash memory device correlates with the number of erase cycles, many solid state drives perform wear-leveling operations (both static and dynamic) in order to spread erasures more evenly over all of the blocks of a flash memory device.

To make sure that all of the physical pages in a NVM (e.g., flash memory device) are used uniformly, the usual practice is to maintain a table for the frequency of use for all of the logical pages and periodically map the most frequently accessed logical address to physical lines. However, these table indirection based methods incur significant overhead in table size. For instance to use a table approach for a 2 terabyte (TB) storage device with 512 byte pages, a 137 gigabyte (GB) table would be needed. This is clearly not practical.

SUMMARY

In one aspect, the disclosure provides a method for determining a physical block address (PBA) of a non-volatile memory (NVM) to enable a data access of a corresponding logical block address (LBA), the method comprising: generating a first physical block address (PBA) candidate from a LBA using a first function; generating a second physical block address (PBA) candidate from the LBA using a second function; and selecting either the first PBA candidate or the second PBA candidate for the data access based on information related to a background swap of data stored at the first PBA candidate and a background swap of data stored at the second PBA candidate.

In another aspect, the disclosure provides a system for determining a physical block address (PBA) of a non-volatile memory (NVM) to enable a data access of a corresponding logical block address (LBA), the system comprising: a first network configured to generate a first PBA candidate from a LBA using a first function; a second network configured to generate a second PBA candidate from the LBA using a second function; and a select logic configured to select either the first PBA candidate or the second PBA candidate for the data access based on information related to a background swap of data stored at the first PBA candidate and a background swap of data stored at the second PBA candidate.

Another aspect of the disclosure provides a system for determining a physical block address (PBA) of a non-volatile memory (NVM) to enable a data access of a corresponding logical block address (LBA), the system comprising: means for generating a first PBA candidate from a LBA using a first function; means for generating a second PBA candidate from the LBA using a second function; and means for selecting either the first PBA candidate or the second PBA candidate for the data access based on information related to a background swap of data stored at the first PBA candidate and a background swap of data stored at the second PBA candidate.

BRIEF DESCRIPTION OF THE DRAWINGS

FIG. 18 is a table illustrating a numerical example of global mapping using bit inverse on G bits in accordance with one embodiment of the disclosure.

FIG. 19 is a table illustrating a numerical example of local interleaving using a permutation on N–G bits in accordance with one embodiment of the disclosure.

DETAILED DESCRIPTION

Figure 1:
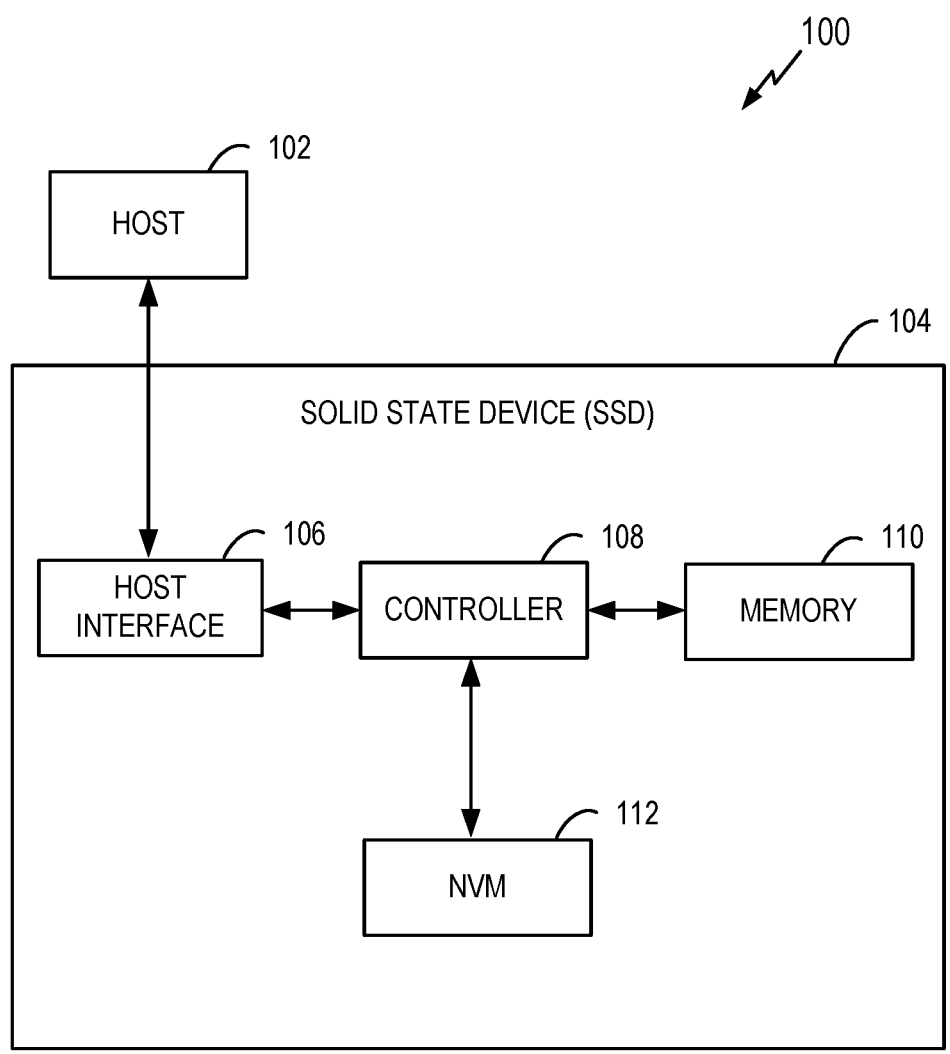
FIG. 1 is a block diagram of a solid state device (SSD) that can perform local address mapping in accordance with one embodiment of the disclosure.

Referring now to the drawings, systems and methods for mapping logical block addresses (LBAs) to physical block addresses (PBAs) for non-volatile memories (NVMs) are illustrated. One such method involves determining a physical block address (PBA) of a non-volatile memory (NVM) to enable a data access of a corresponding logical block address (LBA), and includes (1) generating a first physical block address (PBA) candidate from a LBA using a first function, (2) generating a second physical block address (PBA) candidate from the LBA using a second function, and (3) selecting either the first PBA candidate or the second PBA candidate for the data access based on information related to a background swap of data stored at the first PBA candidate and a background swap of data stored at the second PBA candidate. In one example, the first function and/or the second function may include a function performed by at least one of a multi-stage interconnection network or a block cipher. In another example, the first function and/or the second function may further include an exclusive OR function.

Embodiments of these mapping systems and the corresponding methods may involve substantially less hardware, and more specifically, less storage to manage mapping LBAs to PBAs than say the indirection tables discussed above. Moreover, these mapping systems and methods may work well in conjunction with random address mapping in non-volatile memories using local and global interleaving as are illustrated in FIGS. 15-25 and discussed in detail below.

FIG. 1 is a block diagram of a solid state device (SSD) that can perform local address mapping in accordance with one embodiment of the disclosure. The system 100 includes a host 102 and a SSD storage device 104 coupled to the host 102. The host 102 provides commands to the SSD storage device 104 for transferring data between the host 102 and the SSD storage device 104. For example, the host 102 may provide a write command to the SSD storage device 104 for writing data to the SSD storage device 104 or read command to the SSD storage device 104 for reading data from the SSD storage device 104. The host 102 may be any system or device having a need for data storage or retrieval and a compatible interface for communicating with the SSD storage device 104. For example, the host 102 may a computing device, a personal computer, a portable computer, or workstation, a server, a personal digital assistant, a digital camera, a digital phone, or the like.

The SSD storage device 104 includes a host interface 106, a controller 108, a memory 110, and a non-volatile memory 112. The host interface 106 is coupled to the controller 108 and facilitates communication between the host 102 and the controller 108. Additionally, the controller 108 is coupled to the memory 110 and the non-volatile memory 112. The host interface 106 may be any type of communication interface, such as an Integrated Drive Electronics (IDE) interface, a Universal Serial Bus (USB) interface, a Serial Peripheral (SP) interface, an Advanced Technology Attachment (ATA) interface, a Small Computer System Interface (SCSI), an IEEE 1394 (Firewire) interface, or the like. In some embodiments, the host 102 includes the SSD storage device 104. In other embodiments, the SSD storage device 104 is remote with respect to the host 102 or is contained in a remote computing system coupled in communication with the host 102. For example, the host 102 may communicate with the SSD storage device 104 through a wireless communication link.

The controller 108 controls operation of the SSD storage device 104. In various embodiments, the controller 108 receives commands from the host 102 through the host interface 106 and performs the commands to transfer data between the host 102 and the non-volatile memory 112. The controller 108 may include any type of processing device, such as a microprocessor, a microcontroller, an embedded controller, a logic circuit, software, firmware, or the like, for controlling operation of the SSD storage device 104.

In some embodiments, some or all of the functions described herein as being performed by the controller 108 may instead be performed by another element of the SSD storage device 104. For example, the SSD storage device 104 may include a microprocessor, a microcontroller, an embedded controller, a logic circuit, software, firmware, or any kind of processing device, for performing one or more of the functions described herein as being performed by the controller 108. In some embodiments, one or more of the functions described herein as being performed by the controller 108 are instead performed by the host 102. In some embodiments, some or all of the functions described herein as being performed by the controller 108 may instead be performed by another element such as a controller in a hybrid drive including both non-volatile memory elements and magnetic storage elements.

The memory 110 may be any memory, computing device, or system capable of storing data. For example, the memory 110 may be a random-access memory (RAM), a dynamic random-access memory (DRAM), a static random-access memory (SRAM), a synchronous dynamic random-access memory (SDRAM), a flash storage, an erasable programmable read-only-memory (EPROM), an electrically erasable programmable read-only-memory (EEPROM), or the like. In various embodiments, the controller 108 uses the memory 110, or a portion thereof, to store data during the transfer of data between the host 102 and the non-volatile memory 112. For example, the memory 110 or a portion of the memory 110 may be a cache memory.

The non-volatile memory (NVM) 112 receives data from the controller 108 and stores the data. The non-volatile memory 112 may be any type of non-volatile memory, such as a flash storage system, a solid state drive, a flash memory card, a secure digital (SD) card, a universal serial bus (USB) memory device, a CompactFlash card, a SmartMedia device, a flash storage array, or the like.

The controller 108 or NVM 112 can be configured to perform any of the local address mapping schemes described herein.

One way to address the large indirection table issue discussed in the background section above for page based NVMs is to improve the process of mapping logical pages to physical pages, and more specifically, the process for mapping logical block addresses (LBAs) to physical block addresses (PBAs).

Local Address Mapping

Figure 2:
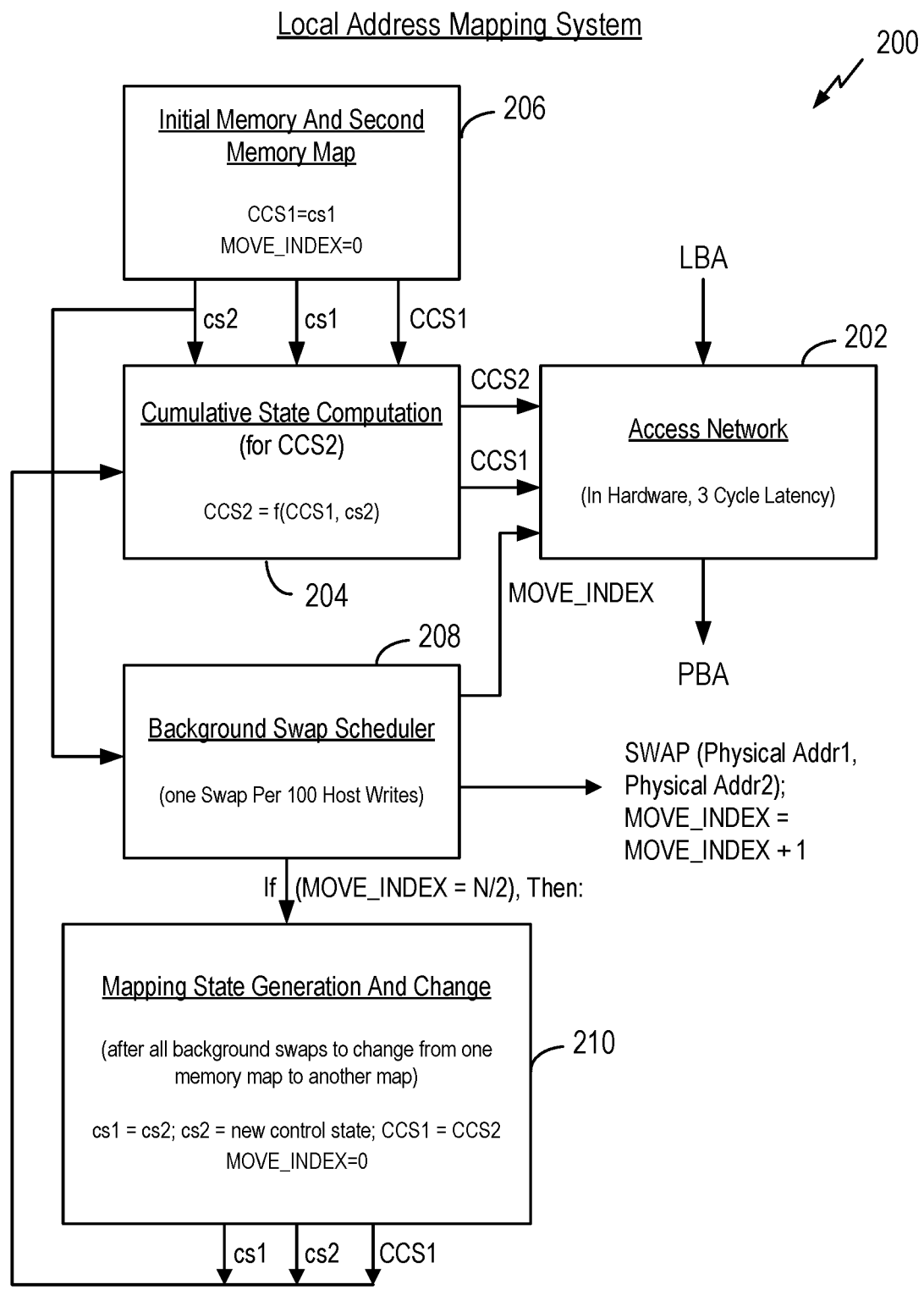
FIG. 2 is a block diagram of a system for performing local address mapping including an access network and a cumulative state computation block that can be used to map logical block addresses (LBAs) to physical block addresses (PBAs) in accordance with one embodiment of the disclosure.

FIG. 2 is a block diagram of a system 200 for performing local address mapping including an access network 202 and a cumulative state computation block 204 that can be used to map logical block addresses (LBAs) to a physical block addresses (PBAs) in accordance with one embodiment of the disclosure. The system 200 further includes an initial and second memory map block 206, a background swap scheduler 208, and a mapping state generation and change block 210. In one aspect, the access network 202 can be implemented in hardware (e.g., ultra-low latency with 3 cycle pipeline delay with low logic and memory equivalent of less than 10,000 logic gates) and the remaining components of the system 200 can be implemented in firmware.

The access network 202, which will be discussed in greater detail below, receives the latest two cumulative control states in CCS1 and CCS2 from the cumulative control state block 204 along with a move index from the background swap scheduler 208. Using these inputs, the access network 202 can determine which physical block address (PBA) a given logical block address (LBA) is mapped to using two slave networks (e.g., bitonic or Benes networks) that each receive one of the two cumulative control states to generate a possible mapping.

The cumulative state computation block 204, which will be discussed in greater detail below, initially receives control states in cs1 and cs2 and CCS1 from the initial and second memory map block 206. In one aspect, the initial control states may have random values and CCS1 may be set to cs1. After an initial period, the cumulative state computation block 204 may receive these inputs from the mapping state generation change block 210. Using these inputs, the cumulative state computation block 204 can determine a second cumulative control state, CCS2, which is a function of CCS1 and cs2. The control states, cs1 and cs2, can be used as inputs to a master bitonic network, or another suitable network, and ultimately to determine the second cumulative control state, CCS2. The cumulative control states, CCS1 and CCS2, can be used by the access network 202 to determine current LBA to PBA mappings. In one aspect, the cumulative state may be computed in firmware using the master bitonic network when the system changes the mapping periodically once the system completes all the transfers in the background. The background moves can be scheduled in firmware with another bitonic network using the new control state (e.g., cs2).

In several applications such as dynamic wear leveling, which changes its random memory map from LBA to PBA on a periodic basis, the system 200 may need to compute a cumulative random mapping at any given time point so that a given LBA can be precisely located at a correct PBA. In one example, assume a random map of memory of size $2^{32}$ with a mapping function f1(t1) at time t1, a random map of memory of size $2^{32}$ with a mapping function f2 at time t2, a random map of memory of size $2^{32}$ with a mapping function f3 at time t3, . . . , and a random map of memory of size $2^{32}$ with a mapping function fn at time tn. In operation, the system 200 can compute a cumulative function (cfn) at time tn, such that cfn=fn(cfm), and where cfm is cumulative function at time tm and tm=tn−1. In one aspect, the system 200 can generate a random mapping function (fn) using a bitonic network and a random control switch seed (e.g., using the cumulative state computation block 204). The bitonic network can be configured to provide the random mapping function (fn) using a random control switch seed (e.g., cs1, cs2, . . . , csn). The cumulative function (cfn) can now be passed through a master bitonic sorter and the control switch positions are recorded in the sorting process. These control switch positions, CCSn, can now be used to program a bitonic network with a data width of 1 and a network size of 32 to generate cumulative random mapping for $2^{32}$ entries (e.g., using access network 202). At any time, any of $2^{32}$ entries can be passed through this network to generate a permuted address. These operations will be described in greater detail below.

The background swap scheduler 208 is configured to perform periodic swaps of data stored at preselected PBAs. In one aspect, the background swap scheduler 208 may be configured to perform one swap per every 100 host writes. In another aspect, the background swap scheduler 208 may be configured to perform one swap per every X host writes, where X is a positive integer. In one aspect, the background swap scheduler 208 is configured to perform moves according to a new map for two pages (swap) and thus moves are scheduled for every 200 host writes. The background swap scheduler 208 may maintain a move counter which may be incremented by 1 for every 200 host writes. In one aspect, moves are done in structured fashion on the physical memory using a lookup of a bitonic network using the new control state (e.g., cs2). In one aspect, the move counter (e.g., move index) gets incremented from 1 to N/2. The move counter can also be referred to as move index, move_index, MOVE_INDEX, move_counter, and move counter. For each value, a swap is scheduled such that physical memory at the move counter gets swapped with the physical memory. In one embodiment, for example, the background swap scheduler 208 can perform the swap as follows:

Physical addr1=MOVE_INDEX;
Physical addr2=f_cs2(Physical_addr1);
SWAP(Physical Addr1, Physical Addr2)

In such case, f_cs2 is a resulting random mapping function based on control state cs2. The determination of cs2 is described in greater detail below in the discussion of FIG. 9. In one example, cs2 can be a randomly generated bit sequence of length 320 bits for a bitonic network with 32 inputs and 32 outputs.

In one embodiment, the MOVE_INDEX is set to 0 in the initial memory and second memory map block 206 and also in the mapping state generation and change block 210. In the background swap scheduler 208 the MOVE_INDEX can be incremented by 1 for an arbitrary number of host writes (e.g., per every 100 host writes as in FIG. 2 or per 200 host writes or another suitable number of host writes). In another embodiment, the MOVE_INDEX increment logic can be implemented in hardware as it may be easier to keep track of the host writes in hardware. In such case, MOVE_INDEX can be communicated from a new hardware logic block that implements the MOVE_INDEX increment logic to the background swap scheduler 208 and directly communicates MOVE_INDEX to the access network block 202 instead of being communicated from the background swap scheduler 208 (e.g., firmware) to the access network 202 (e.g., hardware).

In one aspect, these operations of the background swap scheduler 208 may result in a 1 percent write amplification. In one aspect, the swap operation is assumed to be atomic.

The mapping state generation and change block 210 is configured to update control states and cumulative control states once all of the swap transfers are complete. In one aspect, when the move index is equal to N/2, then all of the swap transfers from the previous map to the current map should be complete. Once completed, the mapping state generation and change block 210 can then generate a new map. In one aspect, the move counter (e.g., move index) can be reset (e.g., to 0 or 1). Whenever the mapping change is done, cumulative control states can be computed in firmware and can be supplied to hardware. These values can be scheduled a little in advance in the firmware (e.g., in the mapping state generation and change block 210) to ensure timely communication to the hardware (e.g., access network 202). In one aspect, the old control state (cs1) may be set to the new control state (cs2), and the old cumulative control state (CCS1) may be set to the new cumulative control state (CCS2).

Aspects of the access network 202 and the cumulative state computation block 204 will be discussed in greater detail below.

Figure 3:
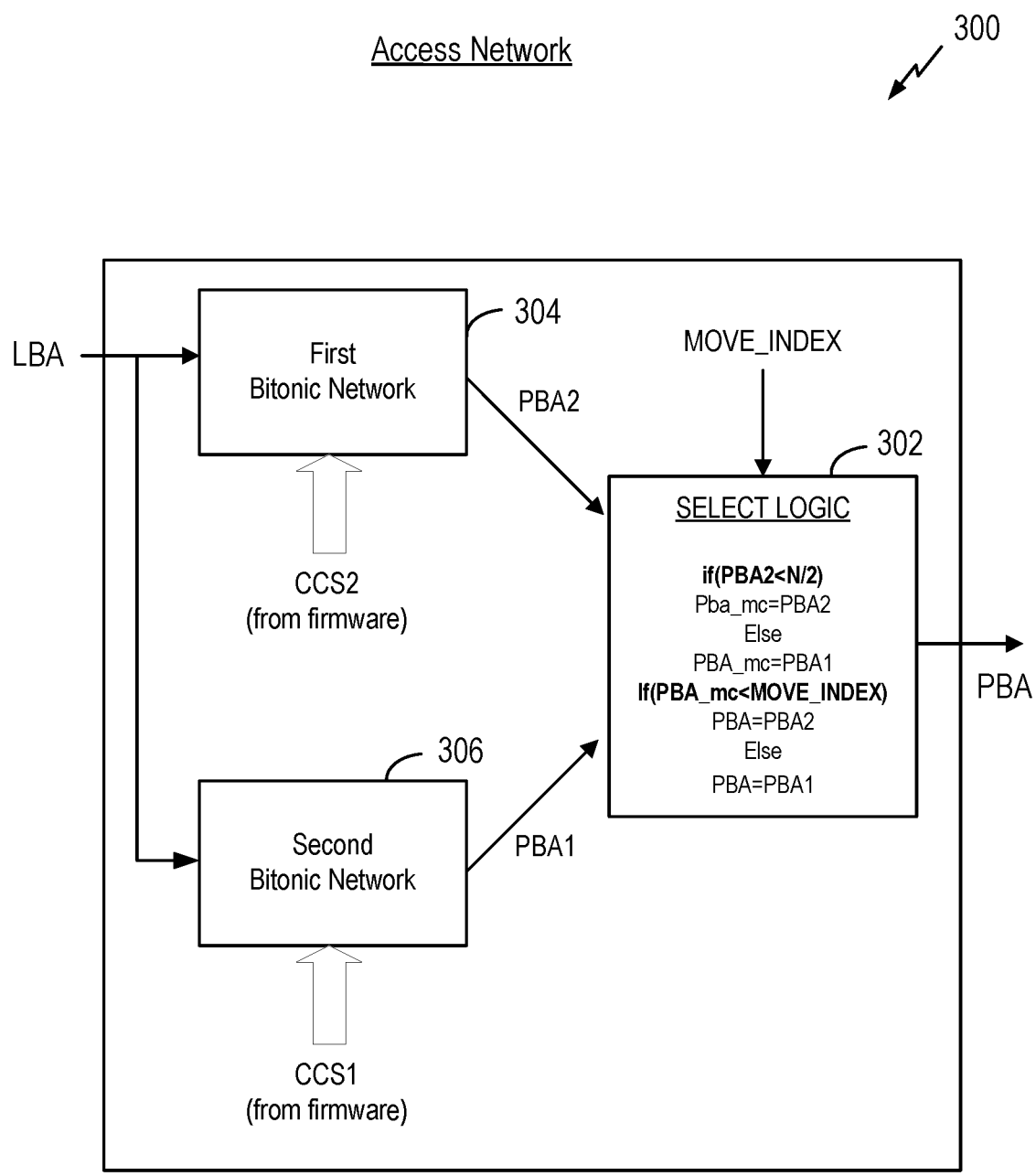
FIG. 3 is a block diagram of an access network, including a select logic block that can be used in the address mapping system of FIG. 2, to map a LBA to a PBA in accordance with one embodiment of the disclosure.

FIG. 3 is a block diagram of an access network 300, including a select logic block 302 that can be used in the address mapping system of FIG. 2, to map a LBA to a PBA in accordance with one embodiment of the disclosure. In one aspect, the access network 300 can be used in the system of FIG. 2 as access network 202. The system 300 further includes a first bitonic network 304 and a second bitonic network 306. The first bitonic network 304 can receive the LBA and new cumulative control state (CCS2) and generate a second possible physical block address (PBA2). Similarly, the second bitonic network 306 can receive the LBA and old cumulative control state (CCS1) and generate a first possible physical block address (PBA1). The select logic 302 can then analyze the locations of the possible PBAs in the page to determine which one is correct mapping using a preselected algorithm. More specifically, the select logic 302 can compare PBA2 to the number of PBAs in the page (N) divided by 2 (e.g., N/2). If PBA2 is less than N/2, then a temporary variable (Pba_mc) is set to PBA2. Otherwise, Pba_mc is set to PBA1. If Pba_mc is less than the move index (MOVE_INDEX) from the background swap scheduler 208 of FIG. 2, then the correct PBA (e.g., output PBA) is PBA2. Otherwise, the correct PBA is PBA1. The operation of the select logic 302 will be described further below.

In one aspect, the select logic block 302 can effectively determine which of two possible PBAs (e.g., PBA1 and PBA2) contains the actual data that corresponds to the LBA of interest. This determination is based on a mid-point of the PBAs in the page (e.g., N/2) and the move index. In comparing the addresses of PBA1 and PBA2 to the midpoint and move index, the select logic block 302 effectively determines which of the two PBAs contains the actual data that corresponds to the LBA of interest at a given time. For example, in FIG. 5, which will be discussed in greater detail below, LBA 9 is stored in PBA 3 at time period CF0, in PBA 11 at CF1, in PBA 8 at CF2, in PBA 14 at CFn−1, and in PBA 4 at CFn. The system can keep track of the last two possible locations, PBA 14 and PBA 4, which are the outputs of the ccs1 and ccs2 functions. The select logic block 302 can then exactly determine whether the data related to LBA 9 is still there at PBA 14 or moved to PBA 4.

In one aspect, the first bitonic network 304 and the second bitonic network 306 can be replaced with a first network and a second network, respectively. In such case, the first network can be configured to generate a first PBA candidate from a LBA using a first function, and the second network can be configured to generate a first PBA candidate from a LBA using a second function. In one aspect, the first function and/or the second function may be a function performed by a multi-stage interconnection network and/or a block cipher. The multi-stage interconnection network may be implemented with one or more of a Benes network, an inverse Benes network, a Bitonic network, an inverse Bitonic network, an Omega network, an inverse Omega network, a Butterfly network, or an inverse Butterfly network. In one aspect, the first function and/or the second function may include an exclusive OR function and a function performed by a multi-stage interconnection network and/or a block cipher.

Figure 4:
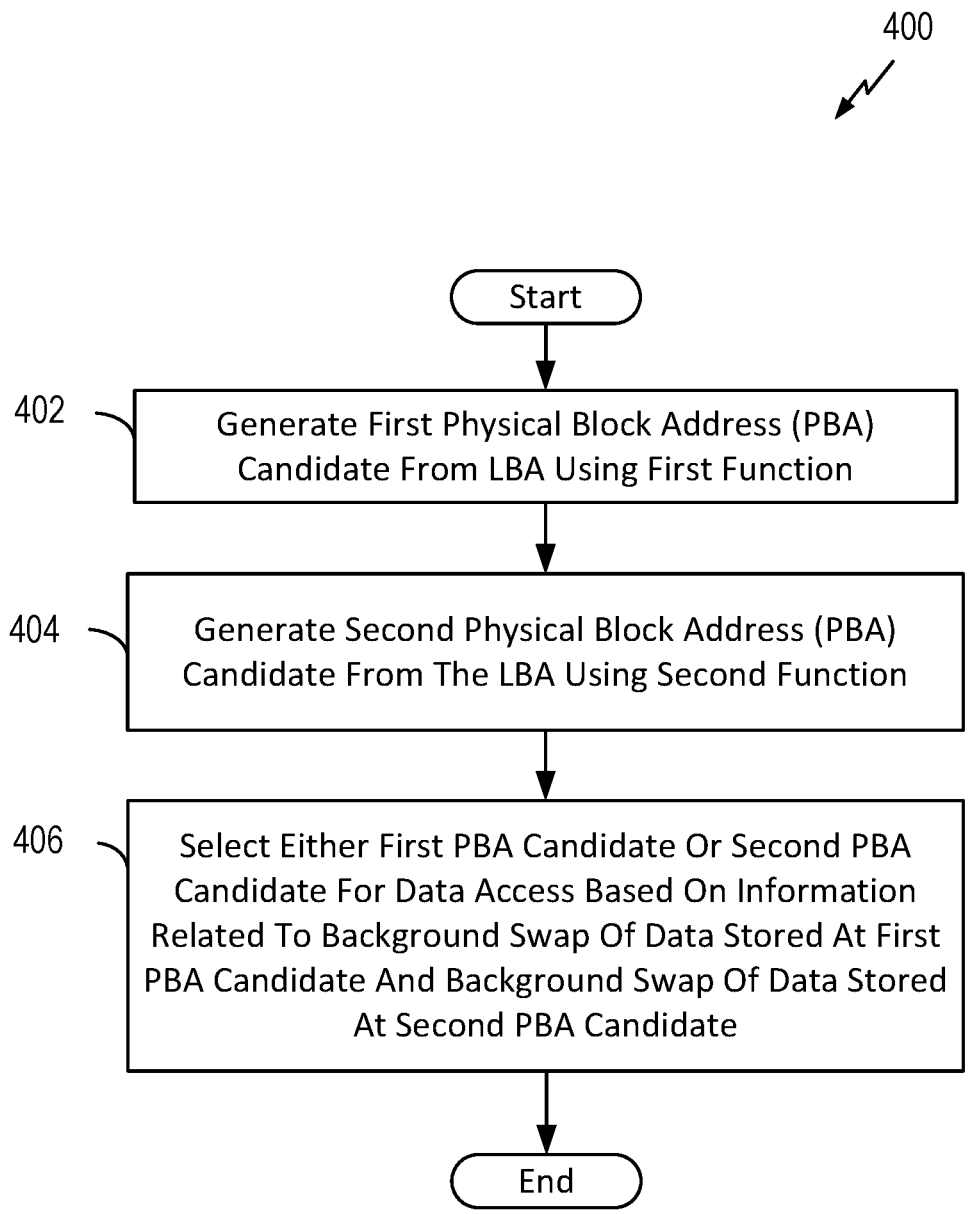
FIG. 4 is a flow chart of a process for mapping a LBA to a PBA in accordance with one embodiment of the disclosure.

In one aspect, any one of the select logic 302, the first bitonic network 304, and/or the second bitonic network 306 can be a special purpose processor or other suitable hardware specifically (such as an application specific integrated circuit or other hardware described above) configured/programmed to perform any of the functions contained within the application, such as the functions illustrated in FIG. 4.

FIG. 4 is a flow chart of a process 400 for mapping a LBA to a PBA in accordance with one embodiment of the disclosure. In one embodiment, the process 400 can be performed by the access network 300 of FIG. 3, or any of the other local address mapping systems described herein. In block 402, the process generates a first physical block address (PBA) candidate from a LBA using a first function. In one aspect, the first function may be a function performed by the first network (e.g., first bitonic network 304 of FIG. 3) as described above. In certain aspects, the actions of block 402 may be effectuated with the controller 108, or with the controller 108 in combination with the host 102 as illustrated in FIG. 1. In certain aspects, block 402 may be effectuated with the first bitonic network 304 of FIG. 3, the second bitonic network 306 of FIG. 3, the select logic 302 of FIG.

3, the controller 108 of FIG. 1, and/or any combination of those components. In one aspect, block 402 may be effectuated with the first bitonic network 304. In one aspect, block 402 may represent one means for generating a first PBA candidate from a LBA using a first function.

In block 404, the process generates a second physical block address (PBA) candidate from the LBA using a second function. In one aspect, the second function may be a function performed by the second network (e.g., second bitonic network 306 of FIG. 3) as described above. In certain aspects, the actions of block 404 may be effectuated with the controller 108, or with the controller 108 in combination with the host 102 as illustrated in FIG. 1. In certain aspects, block 404 may be effectuated with the first bitonic network 304 of FIG. 3, the second bitonic network 306 of FIG. 3, the select logic 302 of FIG. 3, the controller 108 of FIG. 1, and/or any combination of those components. In one aspect, block 404 may be effectuated with the second bitonic network 306. In one aspect, block 404 may represent one means for generating a second PBA candidate from a LBA using a second function.

In block 406, the process selects either the first PBA candidate or the second PBA candidate for the data access based on information related to a background swap of data stored at the first PBA candidate and a background swap of data stored at the second PBA candidate. In one aspect, the process selection may be performed by the select logic 302 of FIG. 3. In certain aspects, the actions of block 406 may be effectuated with the controller 108, or with the controller 108 in combination with the host 102 as illustrated in FIG. 1. In certain aspects, block 406 may be effectuated with the select logic 302 of FIG. 3, the controller 108 of FIG. 1, and/or any combination of those components. In one aspect, block 406 may be effectuated with the select logic 302. In one aspect, block 406 may represent one means for selecting either the first PBA candidate or the second PBA candidate for the data access based on information related to a background swap of data stored at the first PBA candidate and a background swap of data stored at the second PBA candidate.

In one aspect, the information related to the background swap of data stored at the first PBA candidate and the background swap of data stored at the second PBA candidate includes a status of the background swap of data stored at the first PBA candidate and a status of the background swap of data stored at the second PBA candidate. In one aspect, the first PBA candidate and the second PBA candidate may be contained within a PBA map. In such case, examples of the status data may include a position of the second PBA candidate relative to a midpoint of all entries in the PBA map, a PBA move counter based on the position of the second PBA candidate, and/or a move index indicative of a current position of PBA swaps within the PBA map. Examples of the selection process and the use of the mapping status data will be described in further detail below.

In one aspect, the process 400 can also include mapping a portion of a physical address space containing the selected PBA candidate to another portion of the physical address space using at least one of a background data move or a background data swap. In one aspect, this mapping can be performed by the background swap scheduler 208 of FIG. 2.

Figure 11:
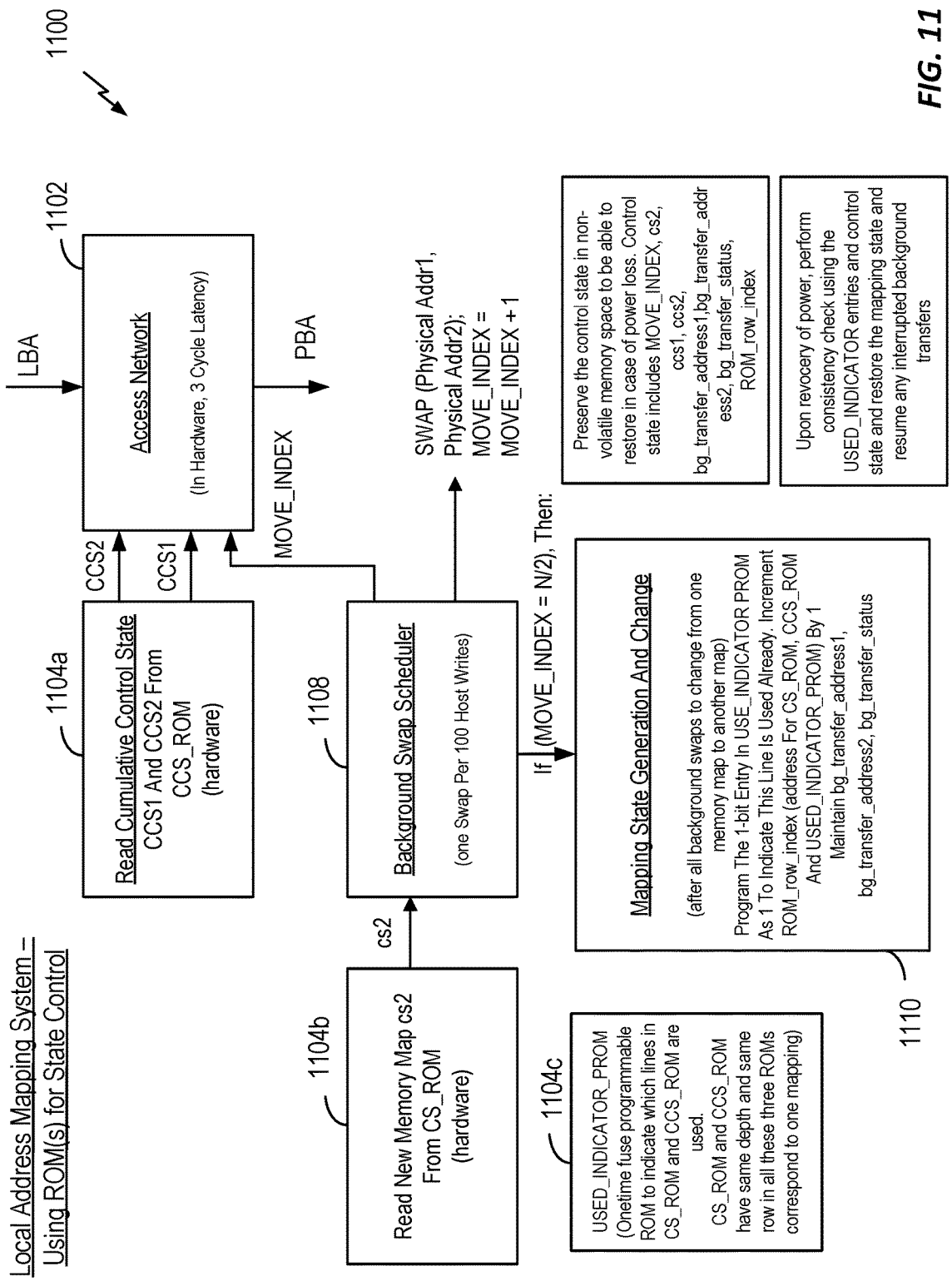
FIG. 11 is a block diagram of another system for local address mapping including an access network and one or more read-only memories (ROMs) for storing pre-calculated cumulative state values in accordance with one embodiment of the disclosure.

In an alternative embodiment, the selecting either the first PBA candidate or the second PBA candidate can be performed using a memory table (see for example system 1100 of FIG. 11 that may store various control states in a ROM or other suitable memory).

In one aspect, the process enables data access of an NVM, where the data access may be a read access or a write access.

FIGS. 5-8 are diagrams of exemplary physical block addresses at discrete times illustrating operation of the select logic on mapping LBAs to PBAs for example values of the PBAs and move index variables in accordance with one embodiment of the disclosure.

Figure 5:
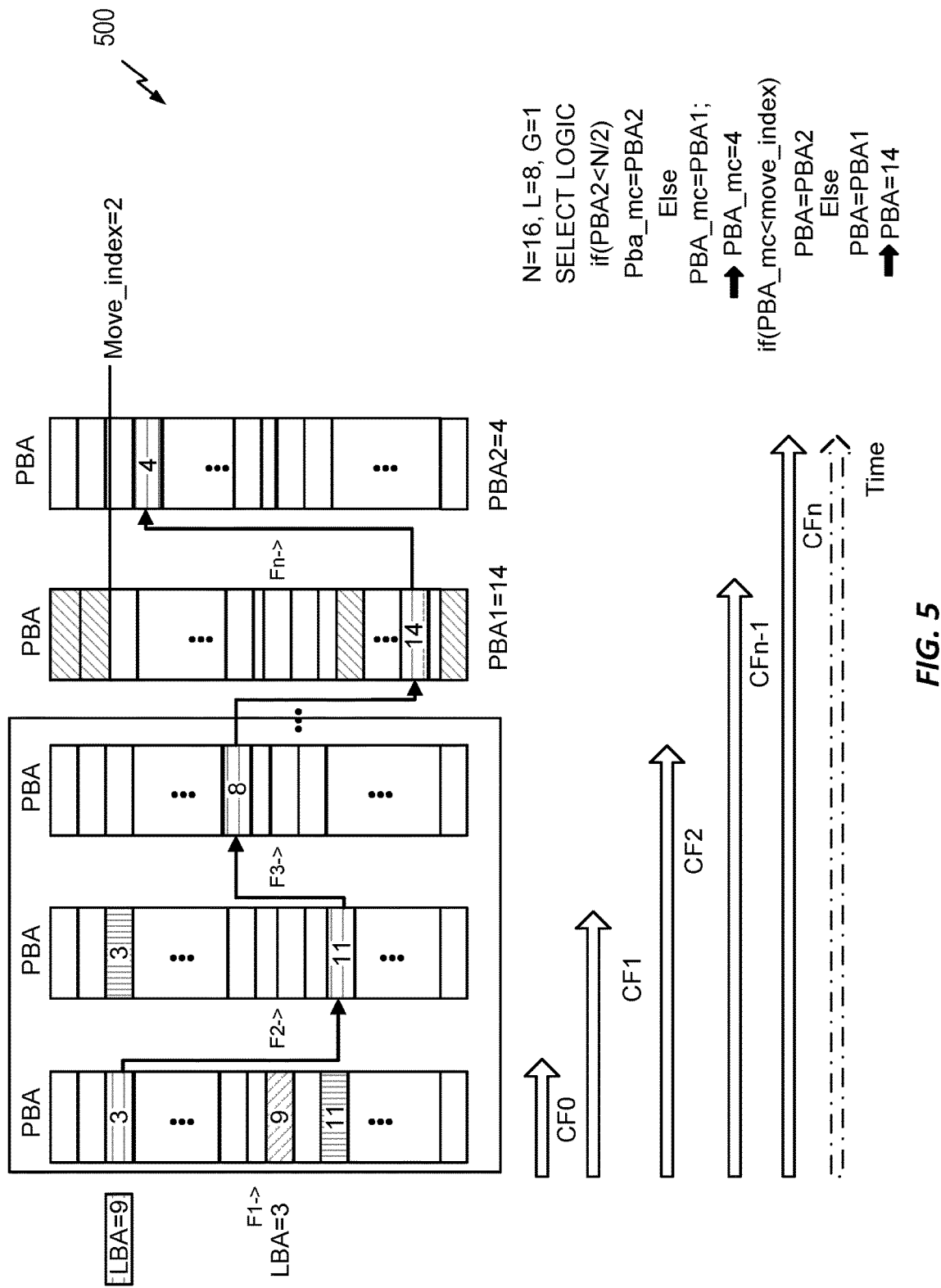
FIGS. 5-8 are diagrams of exemplary physical block addresses at discrete times illustrating operation of the select logic on mapping LBAs to PBAs for example values of the PBAs and move index variables in accordance with one embodiment of the disclosure.

FIG. 5 illustrates operation of the select logic with example values of the PBAs and move index variables where the first condition (e.g., PBA2<N/2) is satisfied and the second condition (e.g., PBA_mc<move_index) is not satisfied such that the correct PBA is PBA1 or slot 14. The diagram 500 shows the physical block address (PBA) memory maps at different time stages (e.g., CF0 to CFn). The select logic operates using the last two memory maps (CFn and CFn−1). Input variables include the move index (move_index=2), the number of entries in the PBA map (N=16), the local bits permuted (L=8), and the global bits permuted (G=1). While variables L and G are shown, they may or may not be used in the select logic. Since the PBA2 is a location that has not been swapped since it is less than the move index (move_index=2 for this example), the select logic effectively determines that PBA2 is not correct and selects PBA1 which it knows to be correct. More specifically, in the first condition, the select logic determines that PBA2=4 is less than N/2=8. Thus, Pba_mc is set to PBA2=4. In the second condition, the select logic determines that Pba_mc=4 is not less than the move_index=2, and thus sets the output PBA to be PBA1=14.

In one aspect, the first condition can be changed to compare PBA1 to N/2 (e.g., PBA1>=N/2).

Figure 6:
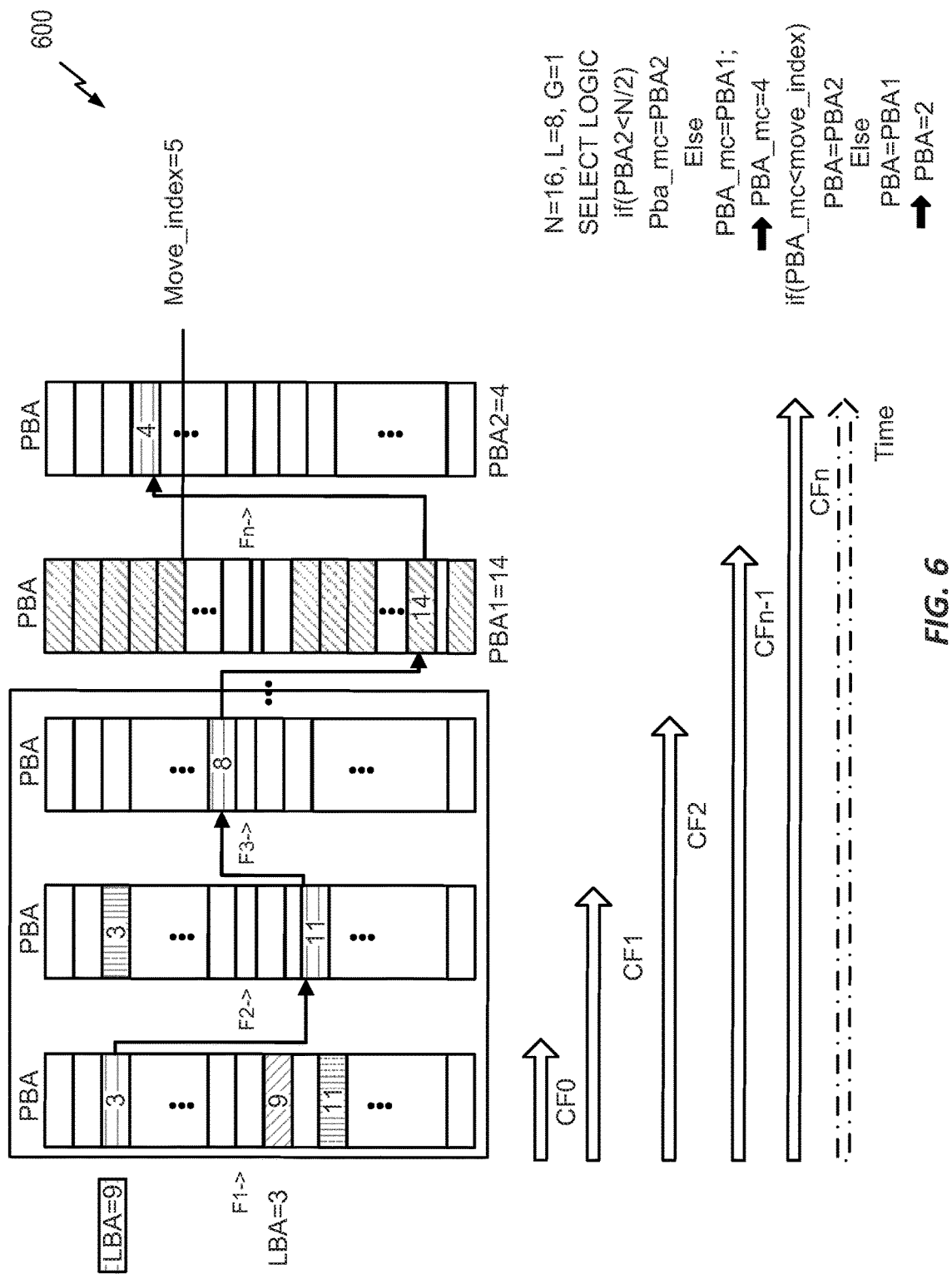

FIG. 6 illustrates operation of the select logic with example values of the PBAs and move index variables where the first condition (e.g., PBA2<N/2) is satisfied and the second condition (e.g., PBA_mc<move_index) is satisfied such that the correct PBA is PBA2 or slot 4. The diagram 600 shows the physical block address (PBA) memory maps at different time stages (e.g., CF0 to CFn). The select logic operates using the last two memory maps (CFn and CFn−1). Input variables include the move index (move_index=5), the number of entries in the PBA map (N=16), the local bits permuted (L=8), and the global bits permuted (G=1). While variables L and G are shown, they may or may not be used in the select logic. Since the PBA2 is a slot that has been swapped since it is less than the move index (move_index=5 for this example), the select logic effectively determines that PBA2 is correct and selects it. More specifically, in the first condition, the select logic determines that PBA2=4 is less than N/2=8. Thus, Pba_mc is set to PBA2=4. In the second condition, the select logic determines that Pba_mc=4 is less than the move_index=5, and thus sets the output PBA to be PBA2=4.

Figure 7:
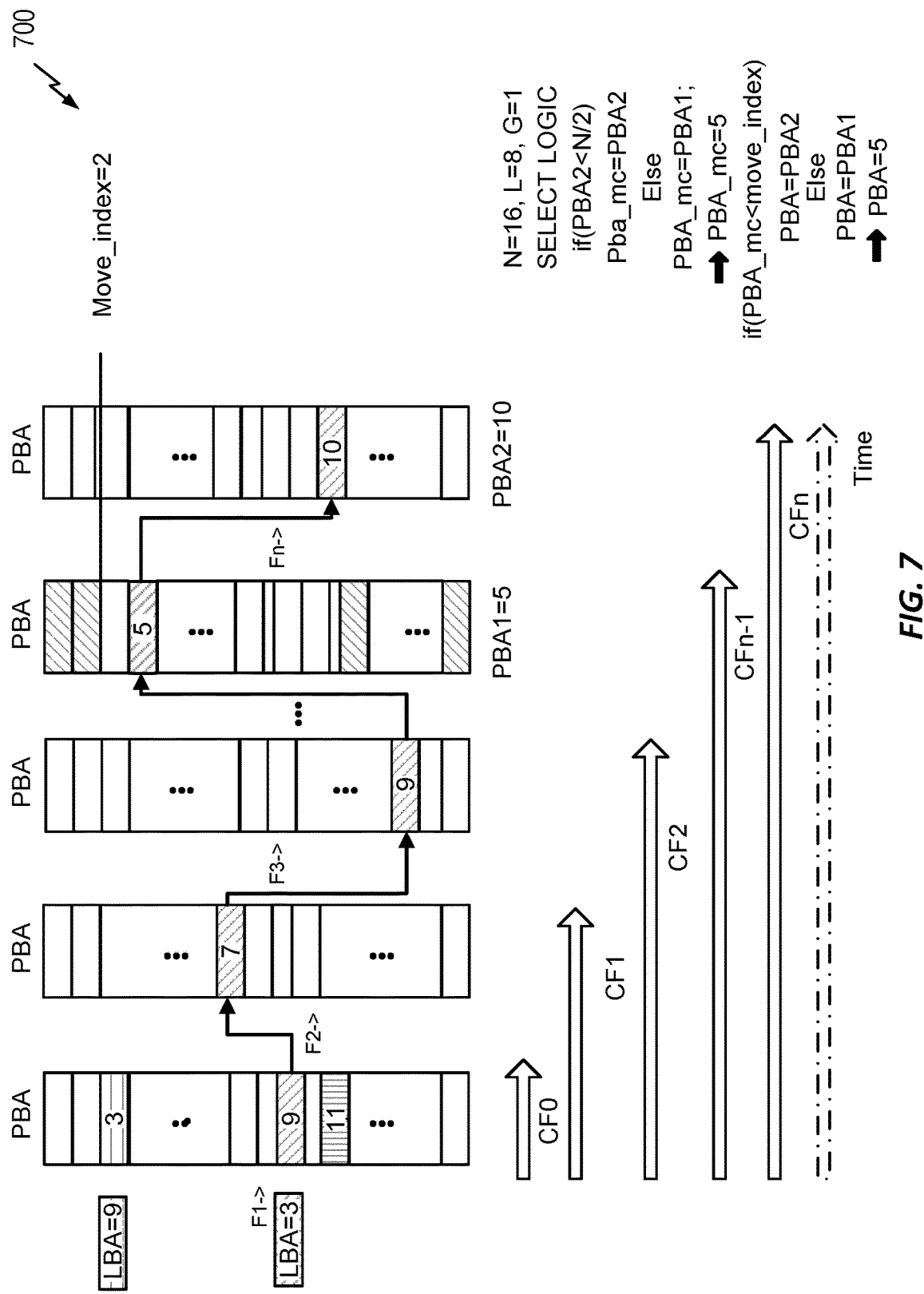

FIG. 7 illustrates operation of the select logic with example values of the PBAs and move index variables where the first condition (e.g., PBA2<N/2) is not satisfied and the second condition (e.g., PBA_mc<move_index) is satisfied such that the correct PBA is PBA1 or slot 5. The diagram 700 shows the physical block address (PBA) memory maps at different time stages (e.g., CF0 to CFn). The select logic operates using the last two memory maps (CFn and CFn−1). Input variables include the move index (move_index=2), the number of entries in the PBA map (N=16), the local bits permuted (L=8), and the global bits permuted (G=1). While variables L and G are shown, they may or may not be used in the select logic. Since the PBA2 is a slot (e.g., slot 10) that has not been swapped since it is greater than the move index (move_index=2 for this example), the select logic effectively determines that PBA2 is not correct and selects PBA1 which it knows to be correct. More specifically, in the first condition, the select logic determines that PBA2=10 is not less than N/2=8. Thus, Pba_mc is set to PBA1=5. In the second condition, the select logic determines that Pba_mc=5 is not less than the move_index=2, and thus sets the output PBA to be PBA1=5.

Figure 8:
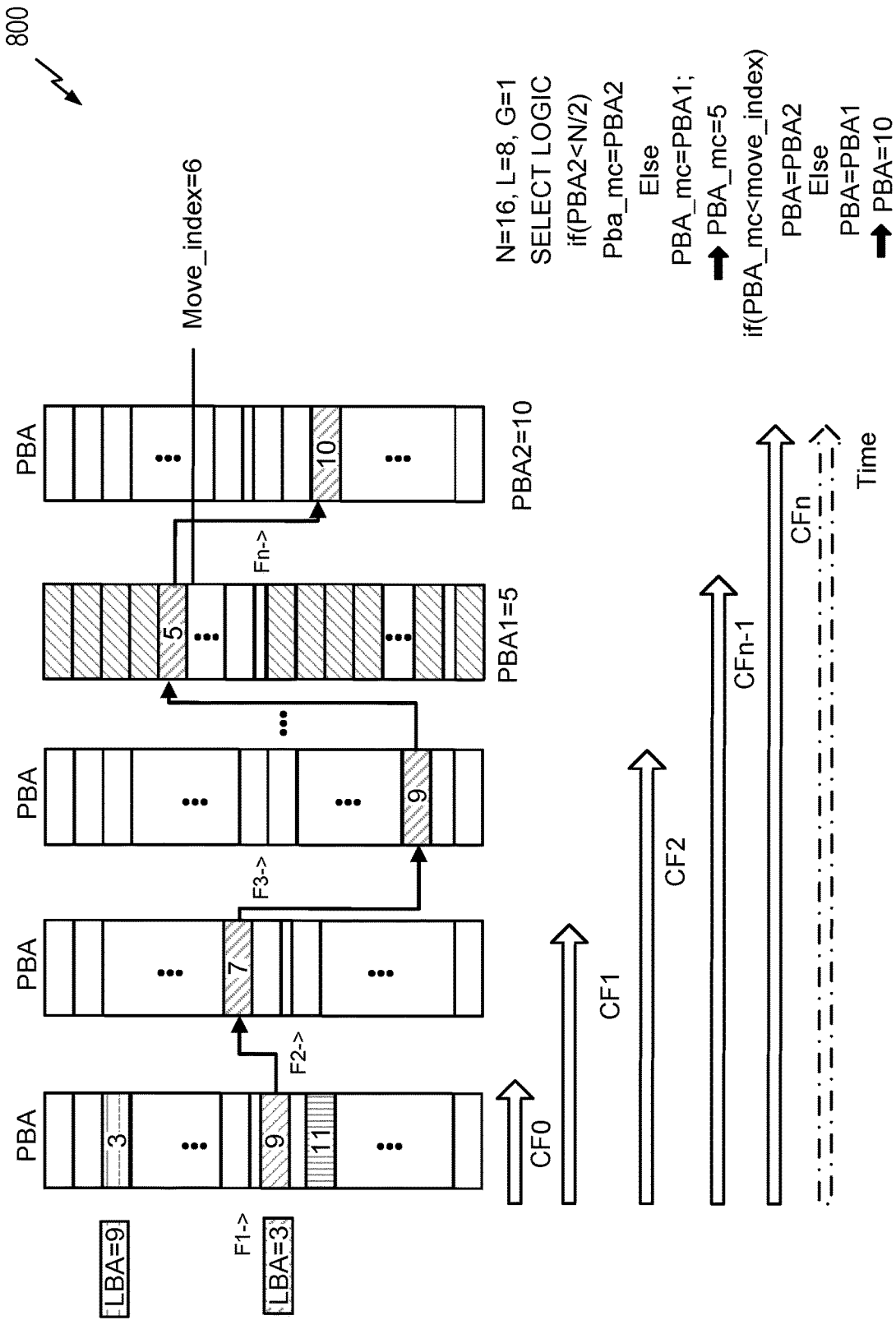

FIG. 8 illustrates operation of the select logic with example values of the PBAs and move index variables where the first condition (e.g., PBA2<N/2) is not satisfied and the second condition (e.g., PBA_mc<move_index) is not satisfied such that the correct PBA is PBA2 or slot 10. The diagram 800 shows the physical block address (PBA) memory maps at different time stages (e.g., CF0 to CFn). The select logic operates using the last two memory maps (CFn and CFn−1). Input variables include the move index (move_index=6), the number of entries in the PBA map (N=16), the local bits permuted (L=8), and the global bits permuted (G=1). While variables L and G are shown, they may or may not be used in the select logic. Since the PBA2 is a slot (e.g., slot 10) that has been swapped since PBA1 was swapped to PBA2 (move index=6 is greater than PBA1=5), the select logic effectively determines that PBA2 is correct and selects it. More specifically, in the first condition, the select logic determines that PBA2=10 is not less than N/2=8. Thus, Pba_mc is set to PBA1=5. In the second condition, the select logic determines that Pba_mc=5 is less than the move_index=6, and thus sets the output PBA to be PBA2=10.

Figure 9:
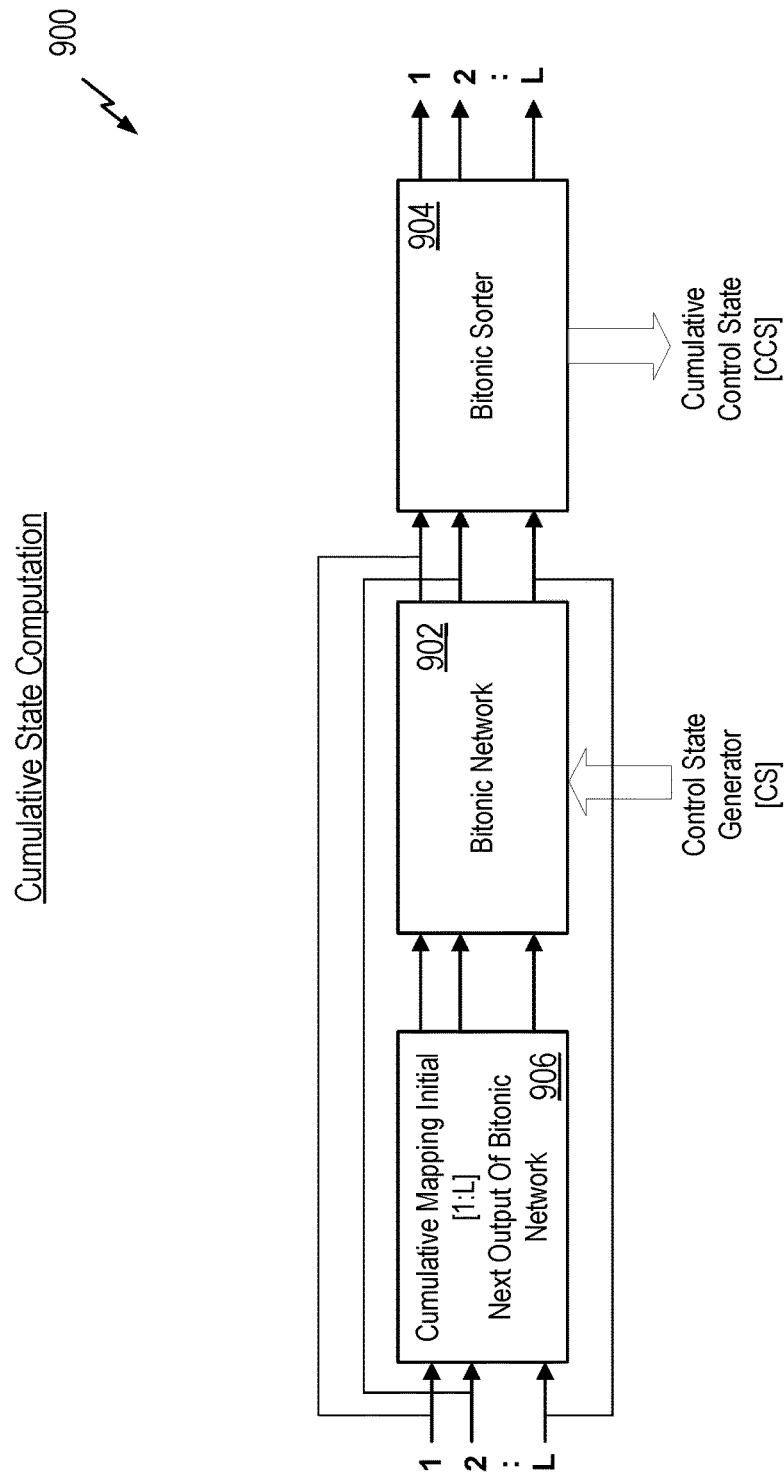
FIG. 9 is a block diagram of a cumulative state computation block including a bitonic network and a bitonic sorter that can be used in the address mapping system of FIG. 2 in accordance with one embodiment of the disclosure.

FIG. 9 is a block diagram of a cumulative state computation block 900 including a bitonic network 902 and a bitonic sorter 904 that can be used in the address mapping system of FIG. 2 in accordance with one embodiment of the disclosure. The cumulative state computation block 900 further includes an cumulative mapping block 906 that may generate/perform some initial mapping and receives the next output of the bitonic network 902 via feedback. The bitonic network 902, a time varying network which can also be a master bitonic network in this system, receives the output of the cumulative mapping block 906 and the control state (cs) and generates a new cumulative mapping. The bitonic sorter 904 receives the new cumulative mapping and determines the switch settings (e.g., cumulative control states or CCS2) needed to go from the initial cumulative mapping to the new cumulative mapping.

In one aspect, at any given time, the system may store the last two values for CCS (for access determination in the hardware or access network) and the current values for CS (for moving). So in one example the control state memory is only about 960 bits (e.g., 320×3 bits). In such case, a global mapping bit for these three mappings (i.e., 3 more bits) may need to be preserved.

As to the use of a bitonic network as compared with a Benes network (described above in discussion of FIG. 3), the bitonic network can have log 2(L/2)*(log 2(L/2)+1)/2*L/2 switches, while the Benes network can have 2*log 2(L/2)*L/2 switches. For example values of L=32 such that L/2=16, the Benes network can have 8 (=2*log 2(16)) stages of switches where each stage consists of 16 (=L/2) switches. In such case, the bitonic network has 20 (=4*(4+1)/2(=log 2(16)*(log 2(16)+1)/2) stages of switches where each stage consists of 16 (=L/2) switches. So the bitonic network may need to be pipelined more to achieve one address look up for a cycle. So the number of 2 by 2 switches needed may thus be 320 versus 128 for the Benes network, which is still small. In one aspect, each switch has two 1-bit multiplexers and each switch needs 3 gates (2 AND gates and 1 OR gate).

So it appears that about 2000 gates versus about 700 gates (exact calculation is 320×6 gates versus 128×6 gates) may be used to implement each network. In one aspect, this may result in 4000 gates for the bitonic network versus 1400 gates for Benes. However, the firmware may be much simpler for the bitonic network.

Aspects of the bitonic sorter and bitonic network will be described in greater detail below.

Figure 10:
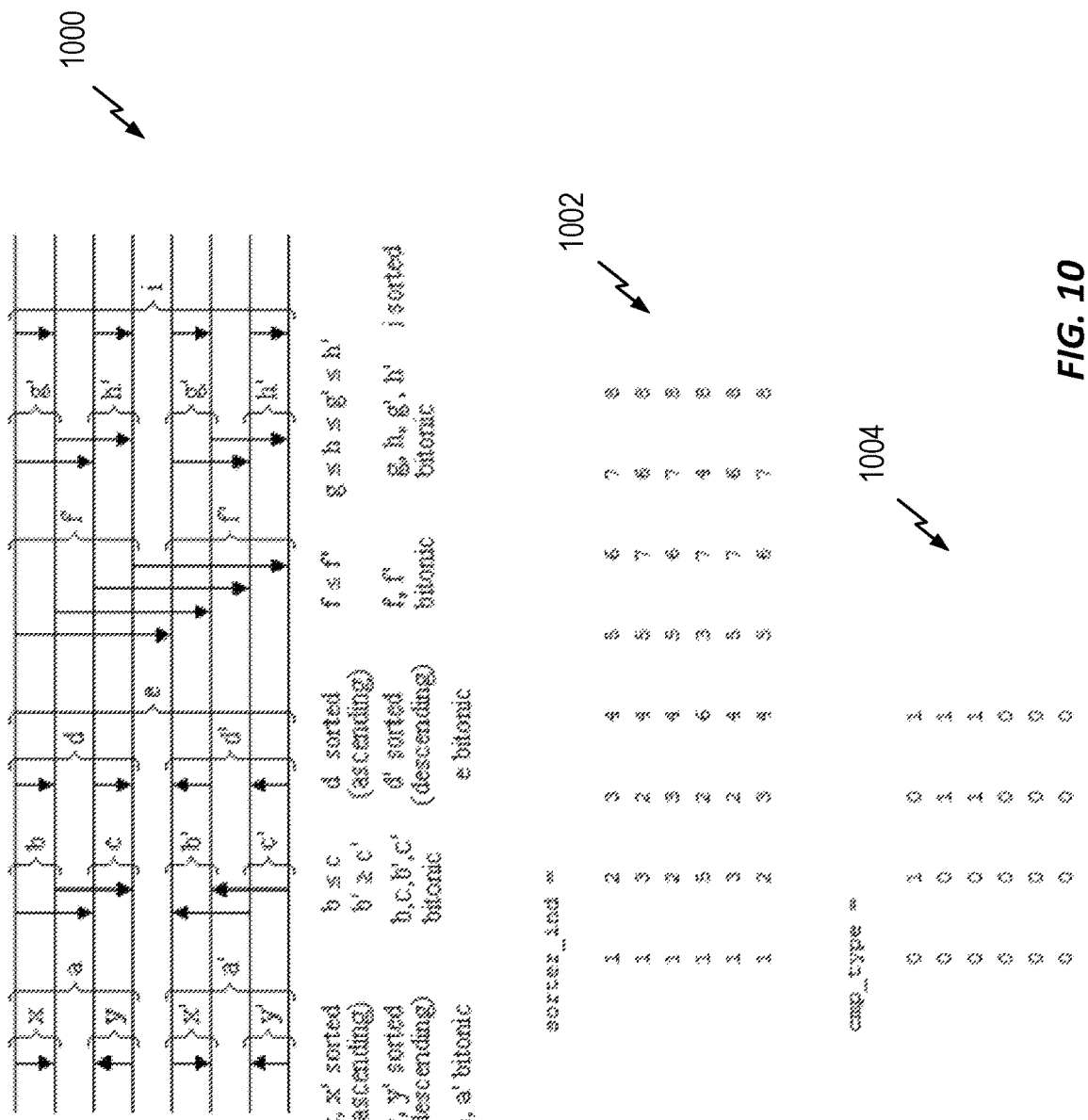
FIG. 10 is a diagram of a bitonic sorter including a sorter table and comparison type table in accordance with one embodiment of the disclosure.

FIG. 10 is a diagram of a bitonic sorter 1000 including a sorter table 1002 and comparison type table 1004 in accordance with one embodiment of the disclosure. A bitonic sorter can have log 2(L/2)*(log 2(L/2)+1)/2*L/2 comparators. For an example, say L=8, and thus L/2=4. In such case, the bitonic sorter can have six stages of comparators, where log 2(8)*(log 2(8)+1)/2=3*(3+1)/2=6, and each stage consists of 4 (=L/2) comparators.

The comparison type table 1004, or "cmp_type", is a matrix of a size with the number of rows equal to log 2(L/2)*(log 2(L/2)+1)/2 (e.g., equal to number of stages of comparators=6) and the number of columns equal to L/2 (e.g., equal to number of comparators in each stage=4). So for L=8, as in the working example, cmp_type 1004 is a matrix of size 6×4. The first row (or in general ith row) in this cmp_type matrix 1004 corresponds to a comparator type of the first stage of comparators (or in general ith stage of comparators) in diagram 1000. The comparator type 0 (e.g., row 1, column 1 of cmp_type 1004) means a comparator taking two inputs (in1, in2) and presenting the outputs (out1, out2) such that first output is the smaller number among the inputs (e.g., out1=minimum(in1,in2)) and second input is the larger number among the inputs (e.g., out2=maximum(in1,in2)). This is shown with the down arrow in diagram 1000. In one aspect, the comparator also gives an output bit that is equal to 1 if a swap occurred (e.g., out1=in2, out2=in1), to 0 if no swap occurred (e.g., out1=in1 and out2=in2). This aspect is not shown in diagram 1000.

The comparator type 1 (e.g., row 1, column 2 of cmp_type 1004) means a comparator taking two inputs (in1, in2) and presenting the outputs (out1, out2) such that first output is the larger number among the inputs (e.g., out1=maximum (in1,in2)) and second input is the smaller number among the inputs (e.g., out2=minimum(in1,in2)). This is shown with the upward arrow in diagram 1000. In one aspect, the comparator also gives an output bit that is equal to 1 if a swap occurred (e.g., out1=in2, out2=in1), to 0 if no swap occurred (e.g., out1=in1, out2=in2). This aspect is not shown in diagram 1000.

The sorter table 1002, "sorter_ind", is a matrix of a size with a number of rows equal to log 2(L/2)*(log 2(L/2)+1)/2 (e.g., equal to number of stages of comparators or 6) and a number of columns equal to L (e.g., equal to number of inputs to each stage of comparators or 8). So for L=8, as in the working example, the sorter_ind 1002 is a matrix of size 6×8. The first row (or in general ith row) in this sorter_ind matrix 1002 corresponds to the port numbers that are connected to the inputs of each stage of bitonic network.

In one aspect, a sequence can be bitonic if it monotonically increases and then monotonically decreases, or if it can be circularly shifted to monotonically increase and then monotonically decrease.

In one aspect, a bitonic network can have the same topology as that of the bitonic sorter 1000 except that that comparators are replaced with 2 by 2 switches with control inputs.

FIG. 11 is another block diagram of a system 1100 for local address mapping including an access network 1102 and one or more read-only memories (ROMs) (1104a, 1104b, 1104c) for storing pre-calculated cumulative control state values in accordance with one embodiment of the disclosure. The system 1100 further includes a background swap scheduler 1108 and a mapping state generation and change block 1110. In one aspect, the access network 1102 and ROMs (1104a, 1104b, 1104c) can be implemented in hardware (e.g., ultra-low latency with 3 cycle pipeline delay with low logic and memory equivalent of less than 10,000 logic gates) and the remaining components of the system 1100 can be implemented in firmware. In operation, the blocks of system 1100 can operate similar to those of system 200 of FIG. 2. A primary difference however in system 1100 is that the cumulative state is computed offline using a master bitonic network, or other suitable network, and then stored (e.g., in a table) in the ROMs (1104a, 1104b, 1104c). In one aspect, this approach can involve using a small amount of additional memory as compared to the system of FIG. 2.

Block 1104a represents a non-volatile memory (e.g., ROM such as CCS_ROM) storing the CCS values (e.g., CCS1 and CCS2). Block 1104b represents a non-volatile memory (e.g., ROM such as CS_ROM) storing the CS values (e.g., cs1 and cs2). Block 1104c represents a non-volatile memory (e.g., programmable ROM such as USE_PROM) effectively storing which lines in the CS_ROM and CCS_ROM are being used in case there is a loss of power. Effectively, the USE_PROM can be used to preserve the control state in a non-volatile memory space to restore in case of power loss. The control state values stored can include MOVE_INDEX, cs2, ccs1, ccs2, bg_transfer_address_1, bg_transfer_address2, bg_transfer_status, and/or ROM_row_index. In one aspect and upon recovery of power, the system 1100 can perform a consistency check using the USE_PROM (e.g., use indicator) entries and control state and restore the mapping state and resume any interrupted background transfers.

Figures 12A, 12B, 12C:
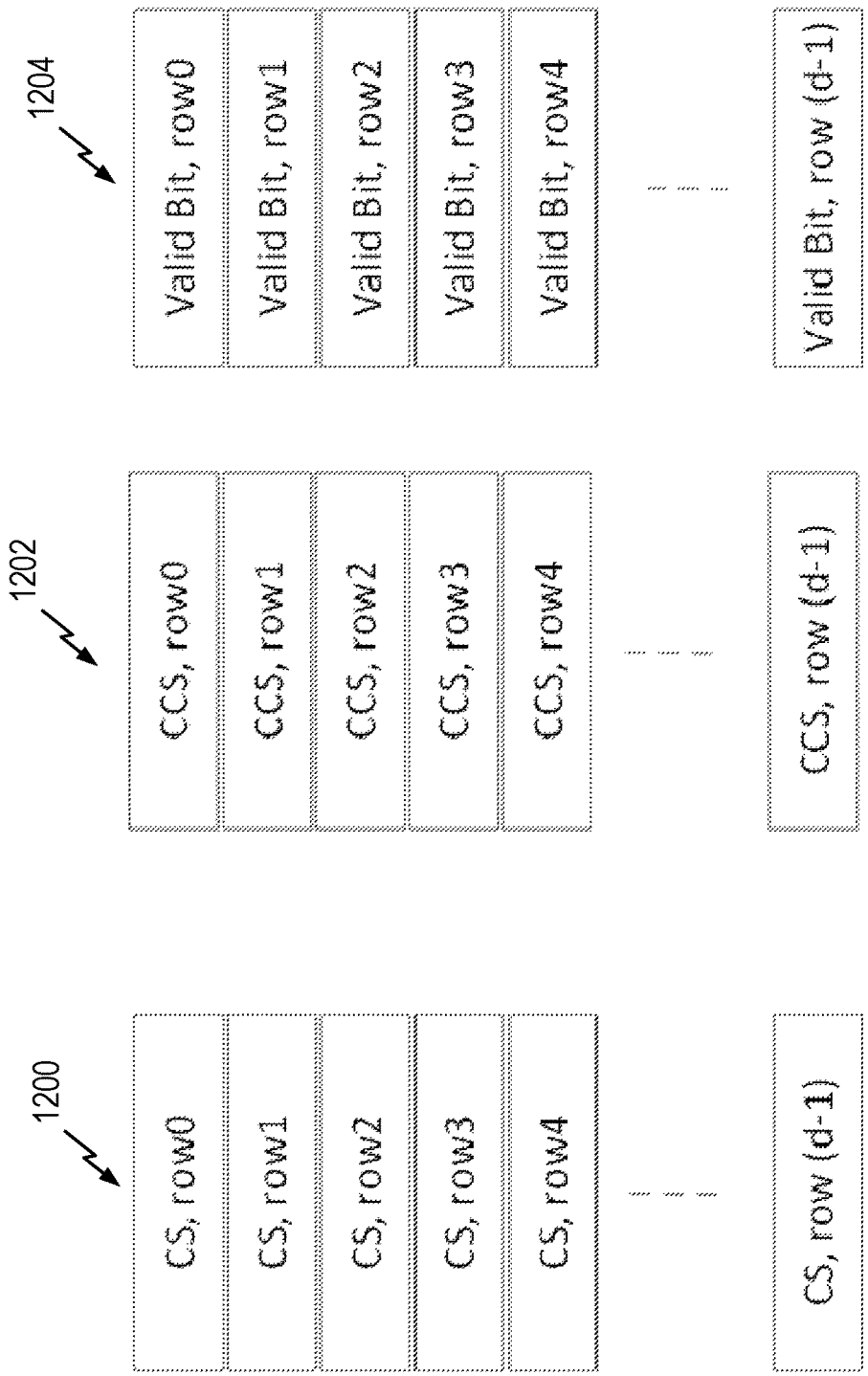
FIGS. 12a, 12b, 12c are schematic diagrams of ROMs for storing control state values, cumulative control state values, and use indicators that can be used in the system of FIG. 11 in accordance with one embodiment of the disclosure.

FIGS. 12a, 12b, 12c are schematic diagrams of ROMs for storing control state values, cumulative control state values, and use indicators that can be used in the system of FIG. 11 in accordance with one embodiment of the disclosure.

FIG. 12a is a schematic diagram of a ROM (CS_ROM) 1200 that can be used to store control state (CS) values used in the system of FIG. 11 in accordance with one embodiment of the disclosure. FIG. 12a illustrates one possible implementation of a non-volatile memory that can be used to store control state values. In another aspect, other implementations can also be used.

FIG. 12b is a schematic diagram of a ROM (CCS_ROM) 1202 that can be used to store cumulative control state (CCS) values used in the system of FIG. 11 in accordance with one embodiment of the disclosure. FIG. 12b illustrates one possible implementation of a non-volatile memory that can be used to store cumulative control state values. In another aspect, other implementations can also be used.

FIG. 12c is a schematic diagram of a PROM (USE_PROM) 1204 that can be used to store control state (CS) values used in the system of FIG. 11 in accordance with one embodiment of the disclosure. More specifically, the USE_PROM 1204 can be used to store index or placeholder information relating to current positions in the CS_ROM and CCS_ROM in a non-volatile memory space to restore in case of power loss. FIG. 12c illustrates one possible implementation of a non-volatile memory that can be used to store index information into the ROMs. In another aspect, other implementations can also be used.

In one aspect, the system 1100 of FIG. 11 can increment a ROM_row_index by 1 every time a mapping gets used, where ROM_row_index can be the address for CS_ROM, and CCS_ROM. The system can also program a 1-bit entry in USE_PROM as 1 to indicate this line is used already.

Figure 13:
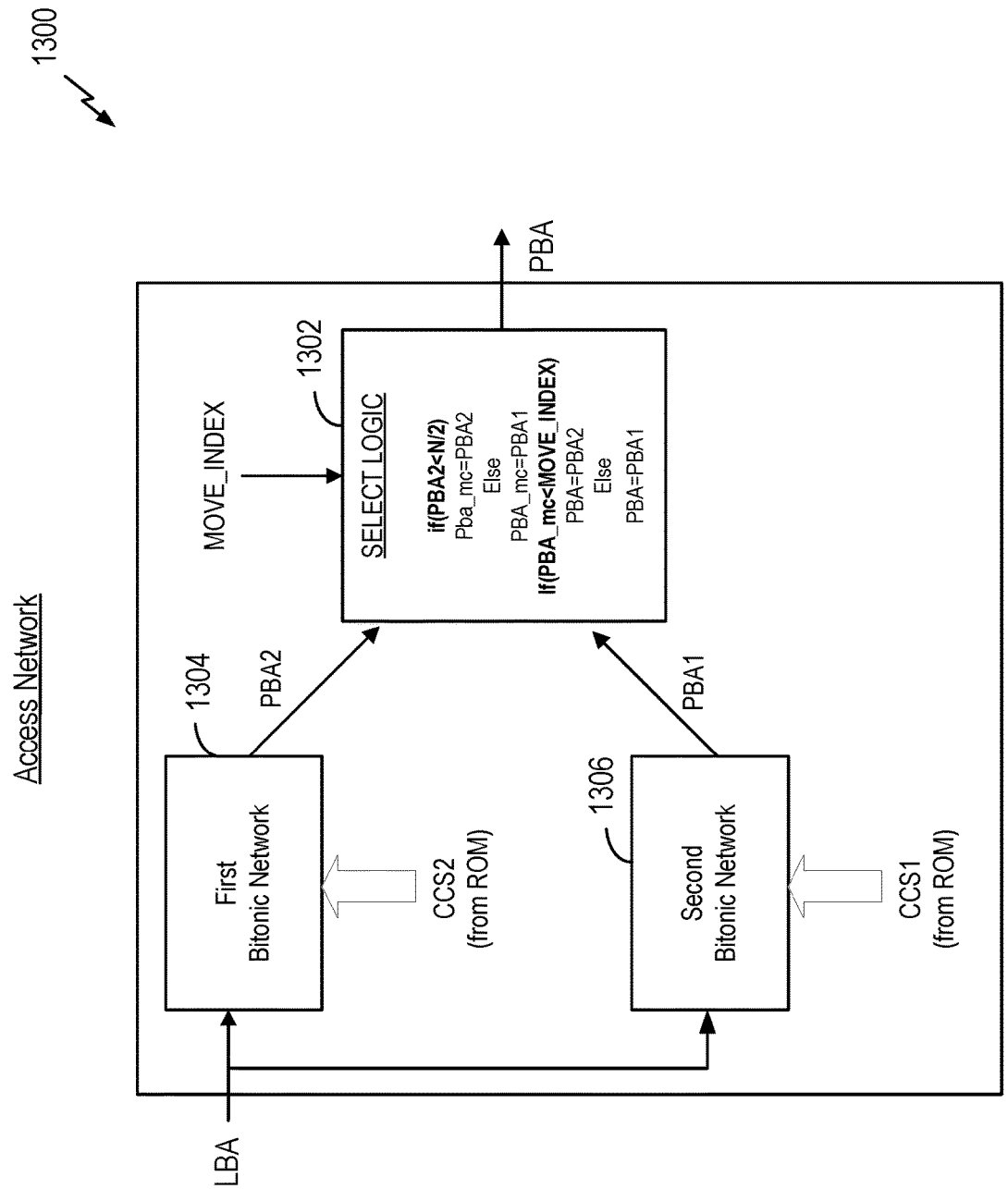
FIG. 13 is a block diagram of another access network, including a select logic block that can be used in the address mapping system of FIG. 11, to map a LBA to a PBA in accordance with one embodiment of the disclosure.

FIG. 13 is a block diagram of another access network 1300 including a select logic block 1302 that can be used in the address mapping system of FIG. 11 in accordance with one embodiment of the disclosure. In one aspect, the access network 1300 can be used in the system of FIG. 11 as access network 1102. The system 1300 further includes a first bitonic network 1304 and a second bitonic network 1306. The system 1300 can operate substantially the same as system 300 of FIG. 3 except that the cumulative control state values (CCS1, CCS2) are received from the ROMs (e.g., 1104a, 1104b, 1104c) rather than from a online cumulative control state block such as block 204 of FIG. 2.

The systems and methods for performing local address mapping described above may be used in conjunction with wear leveling schemes employing random address mapping using local and global interleaving. The following section describes such approaches.

Local/Global Interleaving

Figure 14:
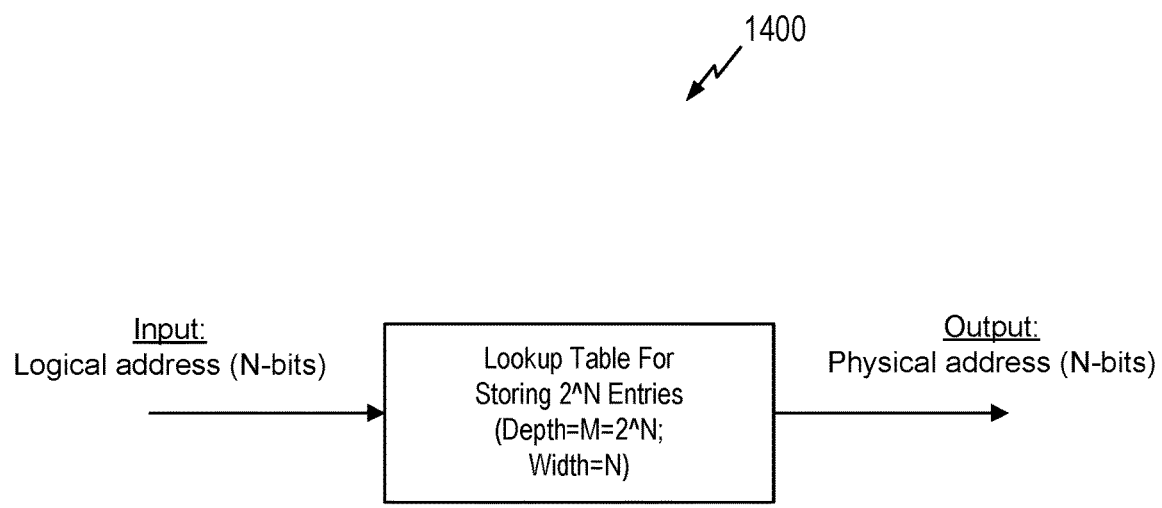
FIG. 14 is a block diagram of indirection table in accordance with one embodiment of the disclosure.

FIG. 14 is a block diagram of indirection table 1400 in accordance with one embodiment of the disclosure. For example, in a drive with M pages/sectors, the indirection table has M entries as is depicted in FIG. 14. In such case, each entry is N bits where N is log 2(M). For a 2 TB drive with 512 byte pages, M=2×10^12B/512B=3.9×10^9 and thus N is equal to 32. As such, the memory required in bits for the table would be M×log 2M=125 GB (~15 GB). The frequency of use table would also consume similar space (~15 GB). So the total requirement would be around 30 GB for this meta data. In some implementations, the meta data may have to be replicated with two plus one redundancy, thereby increasing the complexity up to 90 GB. In such case, this memory usage amounts to around 4.5% of disk space. So this sort of approach would generally not be practical.

Figure 15:
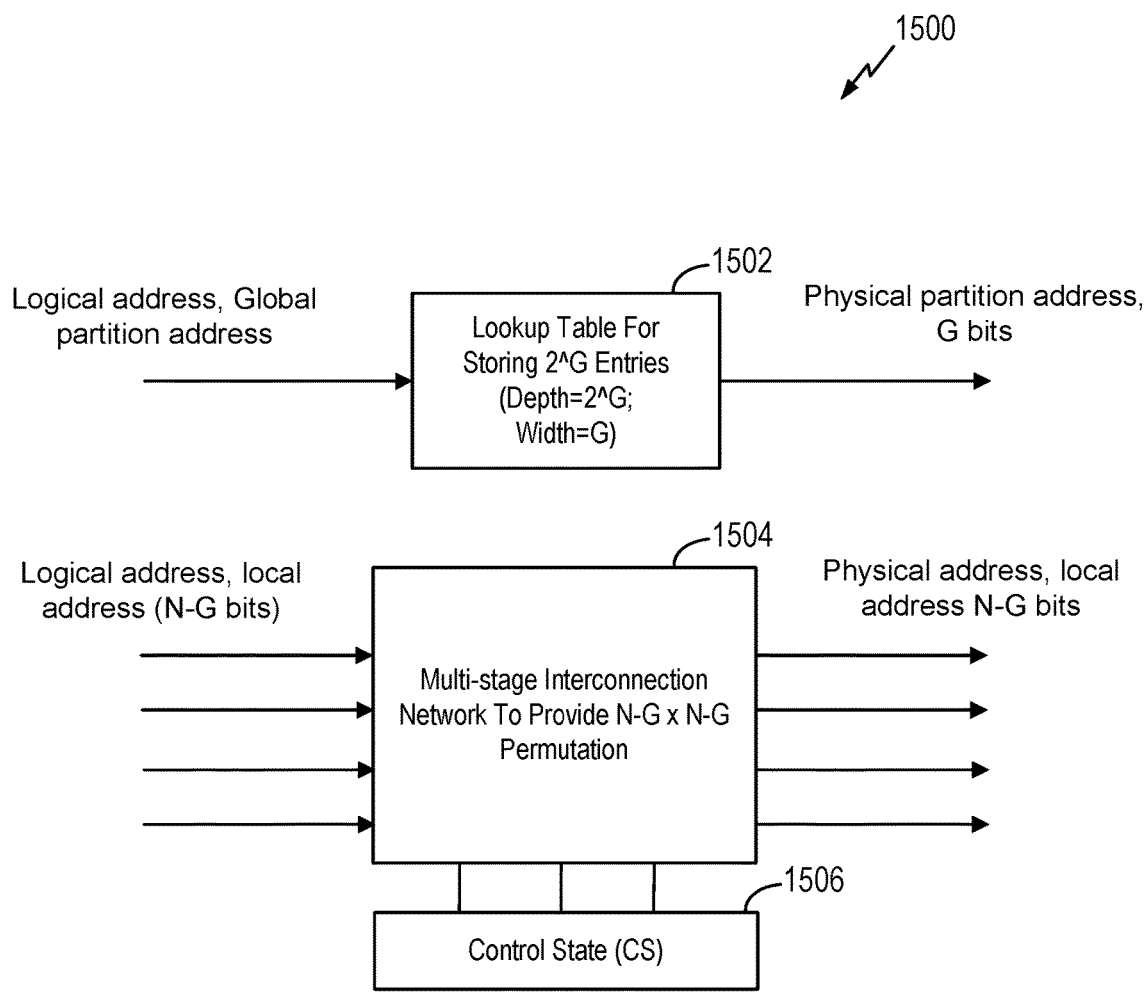
FIG. 15 is a block diagram of a general system for performing random address mapping using local and global interleaving in accordance with one embodiment of the disclosure.

FIG. 15 is a block diagram of a general system for performing random address mapping using local and global interleaving in accordance with one embodiment of the disclosure. The system 1500 includes a lookup table 1502 that can be used to store 2^G entries with a depth of 2^G and a width of G. The system 1500 also includes a multi-stage interconnection network (MIN) 1504 that can be used to provide permutations of data sets, and a control state block 1506 that can be used to control the MIN 1504. The system 1500 illustrates a general framework for mapping an N-bit logical address space to N-bit physical space by first dividing the address bits into G bits and N−G bits. In general, any G bits out of the N bits can be selected using another fixed network. In this context, a fixed network can simply be a fixed arrangement of wires to arrive at a specific network. As compared to a multi-stage programmable interconnection network, the fixed network may not have programmability. For simplicity, the G bits selected are the most significant bits (MSBs) of the N bits. So the system can perform mapping on 2^G entries in block 1502, and perform bit permutation on N−G bits in block 1504. The G bits can be mapped using a 2^G entry mapping table 1502. In one aspect, the mapping can be performed such that there is one-to-one unique mapping and the input is not equal to the output. Also, in one aspect, G is selected such that 1<=G<=N. In one aspect, the case of G<=6 may be of particular interest. If G=N, then this case can be equivalent to the conventional mapping table approach.

In one embodiment, the global mapping can satisfy one or more properties. For example, in one aspect, the global mapping can be a one to one function. In another aspect, the global mapping can be performed such that the input is not equal to the output. In another aspect, a swap can be performed such that a global mapping of a number (k) is equal to kk, while a global mapping of kk is equal to k. So suitable functions for global mapping may include bit inverse mapping, random swap, deterministic swap, and other suitable functions. Bit inverse mapping can be chosen for a simple hardware implementation. If a table is used, the maximum size of the table needed can be $2^G$ entries with each entry having a width of G bits. Since G is not more than 7 in this example, the table approach is also suitable.

In one embodiment, the local mapping can satisfy one or more properties. For example, in one aspect, the local mapping can be a one to one function. So suitable functions for local mapping may include deterministic mapping and/or random mapping. In one aspect, random mapping may be selected. Deterministic or random mapping may be implemented using tables or an Omega network, a Butterfly network, a Benes network, or another suitable network. In one aspect, a Benes network (e.g., such as a master-slave Benes network) is selected as it has the lowest complexity for computing the switch state required. In this network, a bitonic sorting can be implemented on master Benes network on sequences with certain properties to derive the switch state for slave Benes network. In one embodiment, the local address mapping can be performed using any of the local address mapping schemes described above in conjunctions with FIGS. 1-13.

In one embodiment, a wear leveling algorithm implemented with the random address mapping can involve operating in an address space, set partitioning the address space, and local and global interleaving in the address space. In one aspect, the wear leveling algorithm can involve gradual deterministic transition from one memory map to another memory map.

Figure 16:
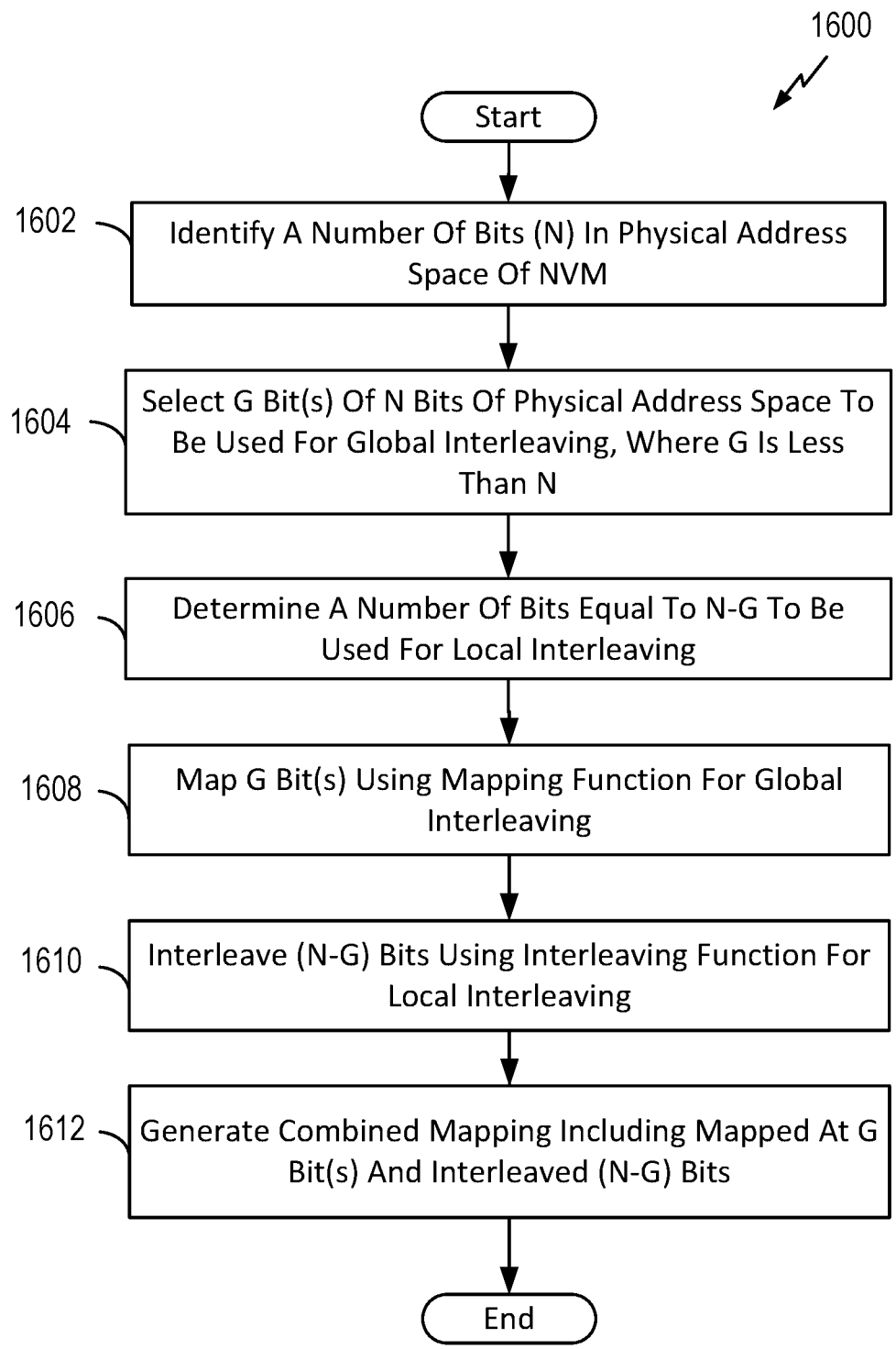
FIG. 16 is a flow chart of a process for performing random address mapping using global mapping and local interleaving in accordance with one embodiment of the disclosure.

FIG. 16 is a flow chart of a process for performing random address mapping using global mapping and local interleaving in accordance with one embodiment of the disclosure. In one embodiment, the process can be used for wear leveling or other random address mapping in any of the random mapping systems described herein. In block 1602, the process identifies a number of bits (N) in a physical address space of a non-volatile memory (NVM). In block 1604, the process selects at least one bit (G) of the N bits of the physical address space to be used for global interleaving, where G is less than N. In block 1606, the process determines a number of bits equal to N minus G (N–G) to be used for local interleaving.

In block 1608, the process maps the G bit(s) using a mapping function for global interleaving. In one embodiment, the mapping function can be a bit inverse mapping function, a random swap mapping function, a deterministic swap mapping function, and/or another suitable mapping function.

In block 1610, the process interleaves (N–G) bits using an interleaving function for local interleaving. In one embodiment, the interleaving function can be a deterministic interleaving function, a random interleaving function, and/or another suitable interleaving function. In one embodiment, the interleaving function can be implemented using an Omega network, a Butterfly network, a Benes network, a master-slave Benes network, and/or another suitable interleaving function.

In some embodiments, the mapping function for the global interleaving is a bit inverse mapping function, and the interleaving function is implemented using a master-slave Benes network. In one such embodiment, the G bit(s) are the most significant bit(s) of the physical address space of the NVM, and the bit inverse mapping function involves inversing each of the G bit(s).

In block 1612, the process generates a combined mapping including the mapped G bit(s) and the interleaved (N–G) bits. In one embodiment, the combined mapping constitutes a mapped physical address (see for example col. 806 in FIG. 8 as will be discussed in more detail below).

Figure 17:
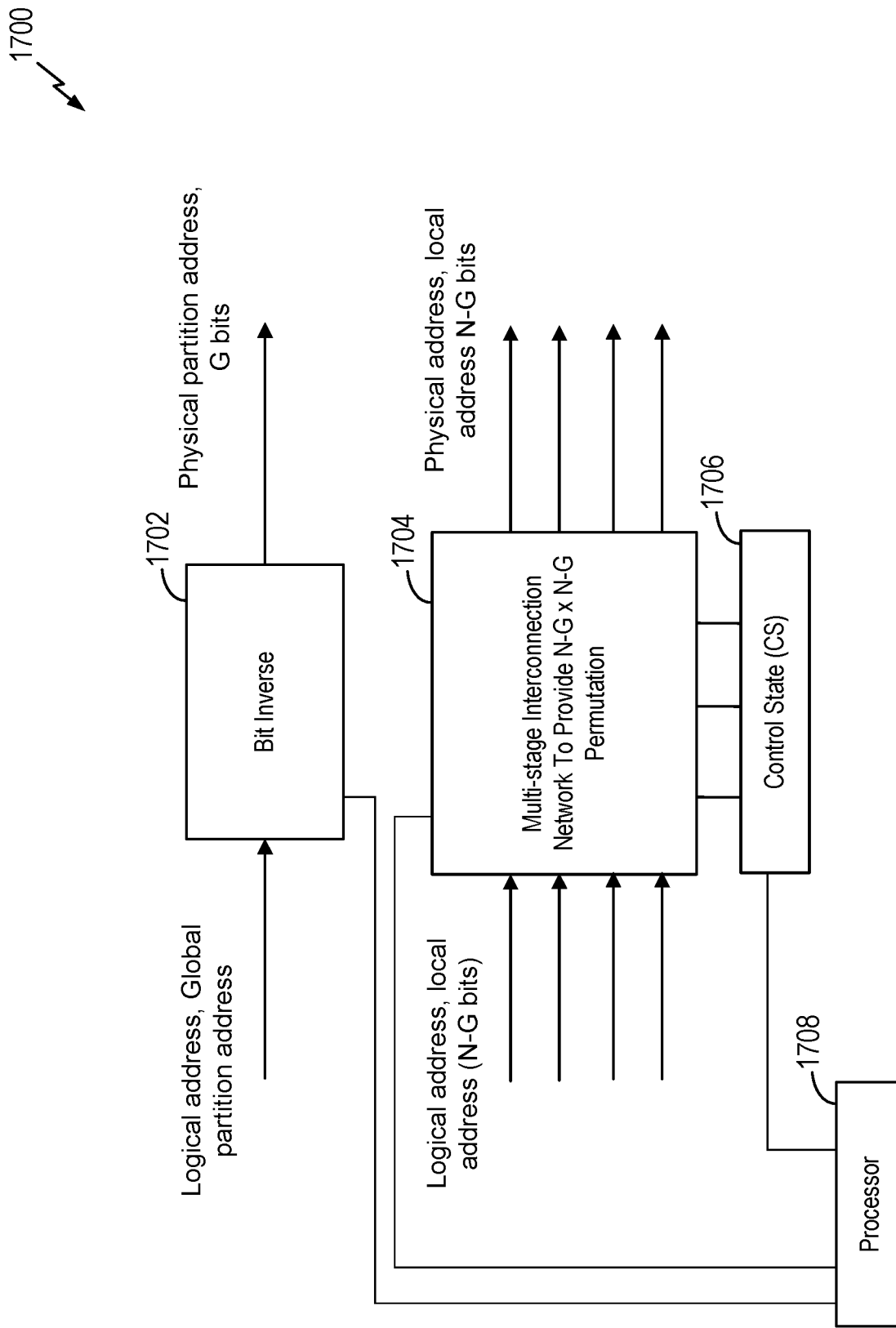
FIG. 17 is a block diagram of a system for performing random address mapping with bit inverse for global mapping (G bits) and permutation for local interleaving (N–G bits) in accordance with one embodiment of the disclosure.

FIG. 17 is a block diagram of a system for performing random address mapping with bit inverse for global mapping (G bits) and permutation for local interleaving (N–G bits) in accordance with one embodiment of the disclosure. The system 1700 includes a bit inverse block 1702 that can be used to inverse selected bits of the logical address. In one aspect, for example, the bit inverse block 1702 can be used to map G bits using a mapping function for global interleaving as is described in block 1608 of FIG. 16, where the mapping function is a bit inversing function. The system 1700 also includes a multi-stage interconnection network (MIN) 1704 that can be used to provide permutations of data sets, such as permutations of selected bits of the logical address. In one aspect, the MIN 1704 can be used to interleave N–G bits using an interleaving function for local interleaving as is described in block 1610 of FIG. 16. The system 1700 also includes a control state block 1706 that can be used to control the MIN 1704.

The system 1700 further includes a processor 1708 which can be used to control and/or perform computations for the bit inverse block 1702 and the MIN 1704. In this context, processor 1708 refers to any machine or selection of logic that is capable of executing a sequence of instructions and should be taken to include, but not limited to, general purpose microprocessors, special purpose microprocessors, central processing units (CPUs), digital signal processors (DSPs), application specific integrated circuits (ASICs), signal processors, microcontrollers, and other suitable circuitry. Further, it should be appreciated that the term processor, microprocessor, circuitry, controller, and other such terms, refer to any type of logic or circuitry capable of executing logic, commands, instructions, software, firmware, functionality, or other such information. In one aspect, the processor 1708 can be used to identify a number of bits (N) in a physical address space of a non-volatile memory (NVM) as is described in block 1602 of FIG. 16, select at least one bit (G) of the N bits of the physical address space to be used for global interleaving, where G is less than N as is described in block 1604 of FIG. 16, and/or determine a number of bits equal to N minus G (N–G) to be used for local interleaving as is described in block 1606 of FIG. 16. In one aspect, the processor 1708 can also be used to generate a combined mapping including the mapped G bit(s) and the interleaved (N–G) bits as is described in block 1612 of FIG. 16. In one embodiment, the combined mapping is instead generated by block 1702 and/or block 1706.

In one simple example to illustrate the address space operations, and as depicted in FIG. 17, assume the number of pages (M) in the NVM is 16 (i.e., M=16 pages). In such case, the number of address bits (N) can be computed as N=log 2(M)=4 address bits. In such case, the parameters of the configuration would be as follows: G=1 ($2^G$ partitions), L=N–G=4–1=3 (3×3 network). This simple example will be carried through FIGS. 18 to 20.

FIG. 18 is a table 1800 illustrating an example of global mapping using bit inverse on G bits in accordance with one embodiment of the disclosure. In one aspect, the table 1800 of FIG. 18 can be viewed as an example of the global mapping shown in block 1702 of FIG. 17. In the continuing simple example, G is 1 bit (i.e., the most significant bit (MSB) of the 4 address bits). In the example of FIG. 18, the table 1800 illustrates the initial addresses in the left column, shown in both decimal and binary. The table 1800 also illustrates the final addresses, after global mapping using bit inverse on the G bits (i.e., the MSB), in the right column of addresses, shown in both decimal and binary. As can be seen in FIG. 18, the global mapping using bit inverse is a one to one function, and the input is not equal to the output. This implementation is consistent with one or more of the possible design characteristics discussed above.

FIG. 19 is a table 1900 illustrating an example of local interleaving using a permutation on N–G bits in accordance with one embodiment of the disclosure. More specifically, for the local interleaving of address bits, assume the 3 address bits ([x2 x1 x0]) are permuted to [x2 x0 x1]. In the example of FIG. 19, the table 1900 illustrates the initial addresses in the left column, shown in both decimal and binary. The table 1900 also illustrates the final addresses, after local mapping using the selected permutation, in the right column of addresses, shown in both decimal and binary. As can be seen in FIG. 19, the local interleaving using permutation is a one to one function. This implementation is consistent with one or more of the possible design characteristics discussed above. In one aspect, the table 1900 of FIG. 19 can be viewed as an example of the local interleaving as shown in block 1704 of FIG. 17.

Figure 20:
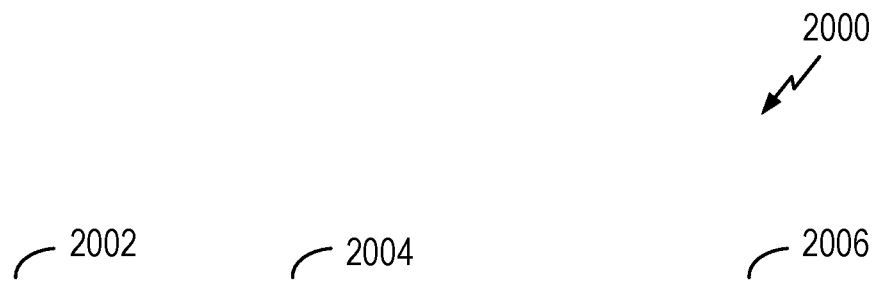
FIG. 20 is a table illustrating a numerical example of global mapping using bit inverse and local interleaving using permutation in accordance with one embodiment of the disclosure.

FIG. 20 is a table 2000 illustrating an example of global mapping using bit inverse and local interleaving using permutation in accordance with one embodiment of the disclosure. The left most column 2002 shows the original addresses in decimal. The middle column 2004 shows the effect of global mapping/interleaving only and matches the final column (e.g., results) of FIG. 18. The right most column 2006 shows the resulting physical addresses with both the global mapping using bit inverse and the local interleaving using a selected permutation. This simple example illustrates one possible operation of the systems and methods of FIGS. 15-17. More specifically, the table 2000 of FIG. 20 can be viewed as an example of the combined mapping that can be generated by any combination of the processor 1708, block 1702 and 1704 of FIG. 17.

Figure 21:
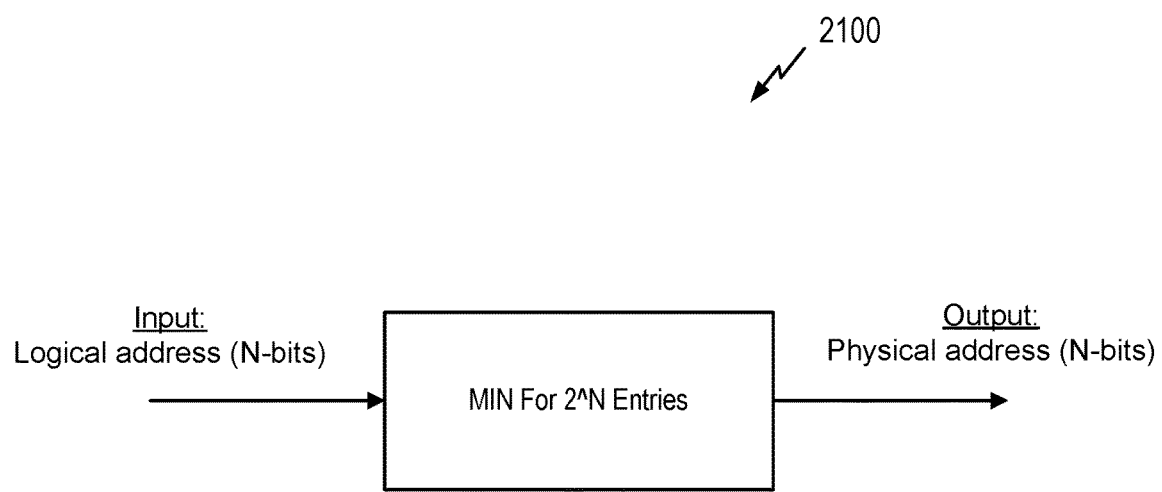
FIG. 21 is a block diagram of a multi-stage interconnection network (MIN) that can be used to perform local interleaving in accordance with one embodiment of the disclosure.

FIG. 21 is a block diagram of a multi-stage interconnection network (MIN) 2100 that can be used to perform local interleaving (e.g., block 1704 in FIG. 17) in accordance with one embodiment of the disclosure. This MIN approach (e.g., multi-stage interconnection network or MIN with 2^N entries) for generating random mapping from logical space and physical space is may be expensive to implement as the storage size can be large.

More specifically, in one aspect, moving items has to be done based on a certain order defined by mapping. For a read process, to differentiate which chip select (CS) has to be used, another table of 2^N entries and each entry width needs to be maintained. In contrast, the CS chip storage is equal to log 2(N)*N/2 for an Omega network and log 2(N)*N for a Benes network.

Figure 22:
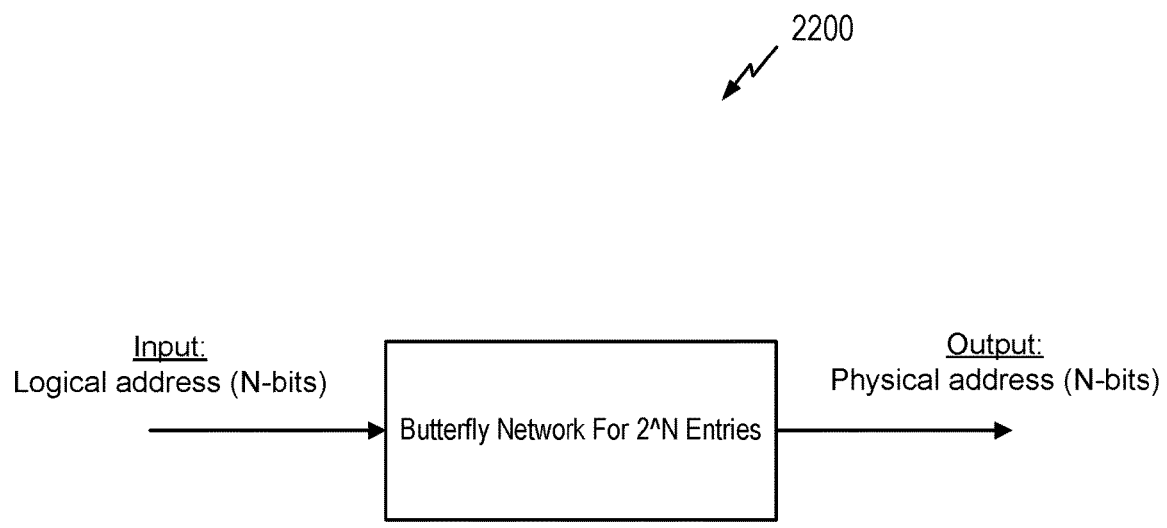
FIG. 22 is a block diagram of a butterfly MIN that can be used to perform local interleaving in accordance with one embodiment of the disclosure.

FIG. 22 is a block diagram of a butterfly MIN 2200 that can be used to perform local interleaving in accordance with one embodiment of the disclosure. This MIN approach (e.g., butterfly MIN on 2^N entries) for generating random mapping from logical space and physical space is a suitable multi-stage interconnection network that may be used, for example, for the MIN 1704 of FIG. 17 or the MIN 1504 of FIG. 15.

For the trivial case of shuffle equal to 1 for the physical address space, the network is not needed as it is easy to figure out the mapping. In this context, an address shuffle can be defined as a left cyclic shift of the physical address, which is a binary string. Consider for example stages 1 to M. At stage k, the physical address of a logical address is given by (xn−1, xn−2, xn−3, xn−k, . . . , x1, x0) is converted to (via inverse) (Xn−1, Xn−2, Xn−3, Xn−k−1, . . . x1, x0). In one aspect, another simpler case may include a butterfly permutation where the MSB is swapped with the LSB, a substitution permutation where any ith bit is swapped with bit 0 (e.g., the LSB), and a super permutation where any ith bit is swapped with the MSB. In another aspect, the local interleaving may involve using any switch combination for each stage.

In general a MIN may be used is one of two modes. For example, in a routing mode, the switches in MIN are configured to realize the desired mapping from input ports to output ports in one or more passes. In such case, each input port takes a multi-bit (say m-bit) word and each output port gives a m-bit word, and there are N inputs and N outputs. In a second mode, an interleaving mode, the switches in MIN are configured using a random seed. This results in a random mapping from input ports to output ports in a single pass. In several aspects, the interleavers and/or interleaving described herein can use a MIN in the interleaving mode to interleave preselected bits in a desired manner.

Figure 23:
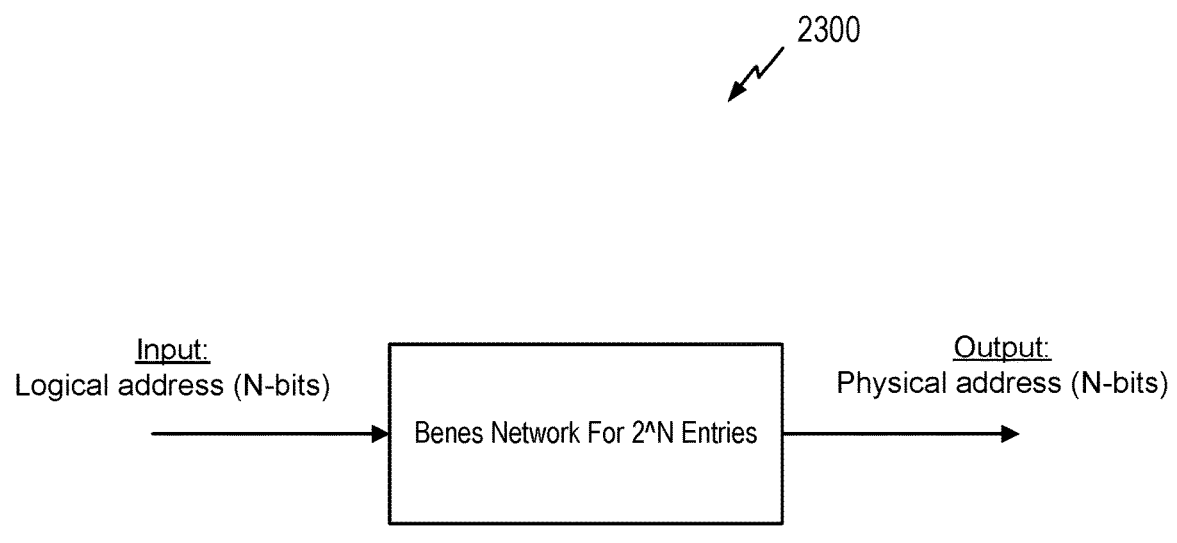
FIG. 23 is a block diagram of a Benes MIN that can be used to perform local interleaving in accordance with one embodiment of the disclosure.

FIG. 23 is a block diagram of a Benes MIN 2300 that can be used to perform local interleaving in accordance with one embodiment of the disclosure. This MIN approach (e.g., Benes MIN on 2^N entries) for generating random mapping from logical space and physical space is a suitable multi-stage interconnection network that may be used, for example, for the MIN 1704 of FIG. 17 or the MIN 1504 of FIG. 15.

Figure 24:
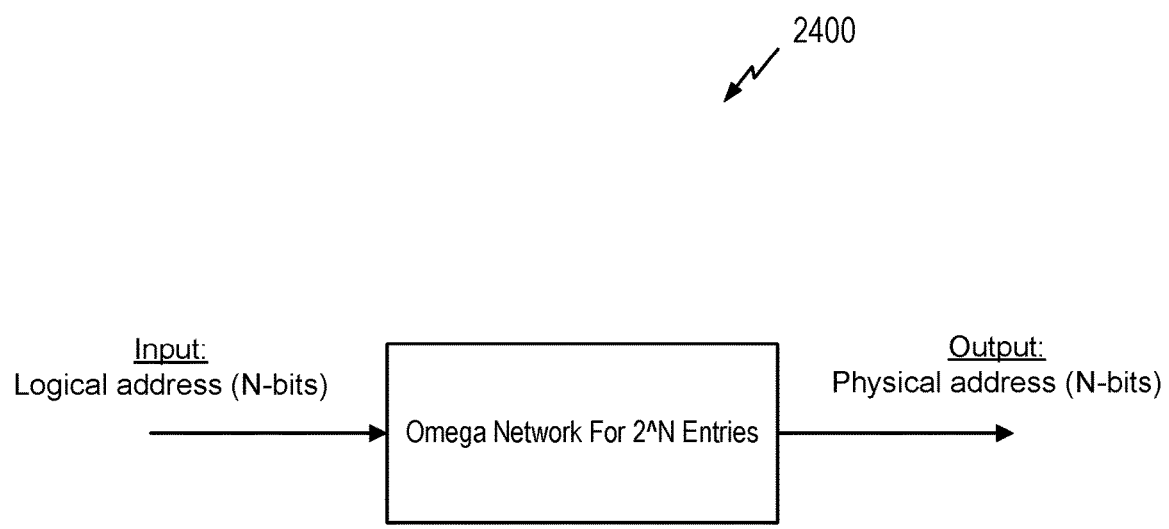
FIG. 24 is a block diagram of a Omega MIN that can be used to perform local interleaving in accordance with one embodiment of the disclosure.

FIG. 24 is a block diagram of a Omega MIN 2400 that can be used to perform local interleaving in accordance with one embodiment of the disclosure. This MIN approach (e.g., Omega MIN on 2^N entries) for generating random mapping from logical space and physical space is a suitable multi-stage interconnection network that may be used, for example, for the MIN 1704 of FIG. 17 or the MIN 1504 of FIG. 15. In one aspect, the Omega network may only be able to provide a subset of all possible permutations of switching while the Benes network may be able provide all possible permutations. In one aspect, if a desired permutation is required, it may be difficult to solve chip select settings for the Benes network. To counter this potential issue, one implementation of the Benes network involves randomly setting the chip select settings, which can makes the chip select algorithm much simpler. That is, the randomly generated chip select settings reduce computing time requirements and/or computing challenges needed to solve the chip select settings.

Figure 25:
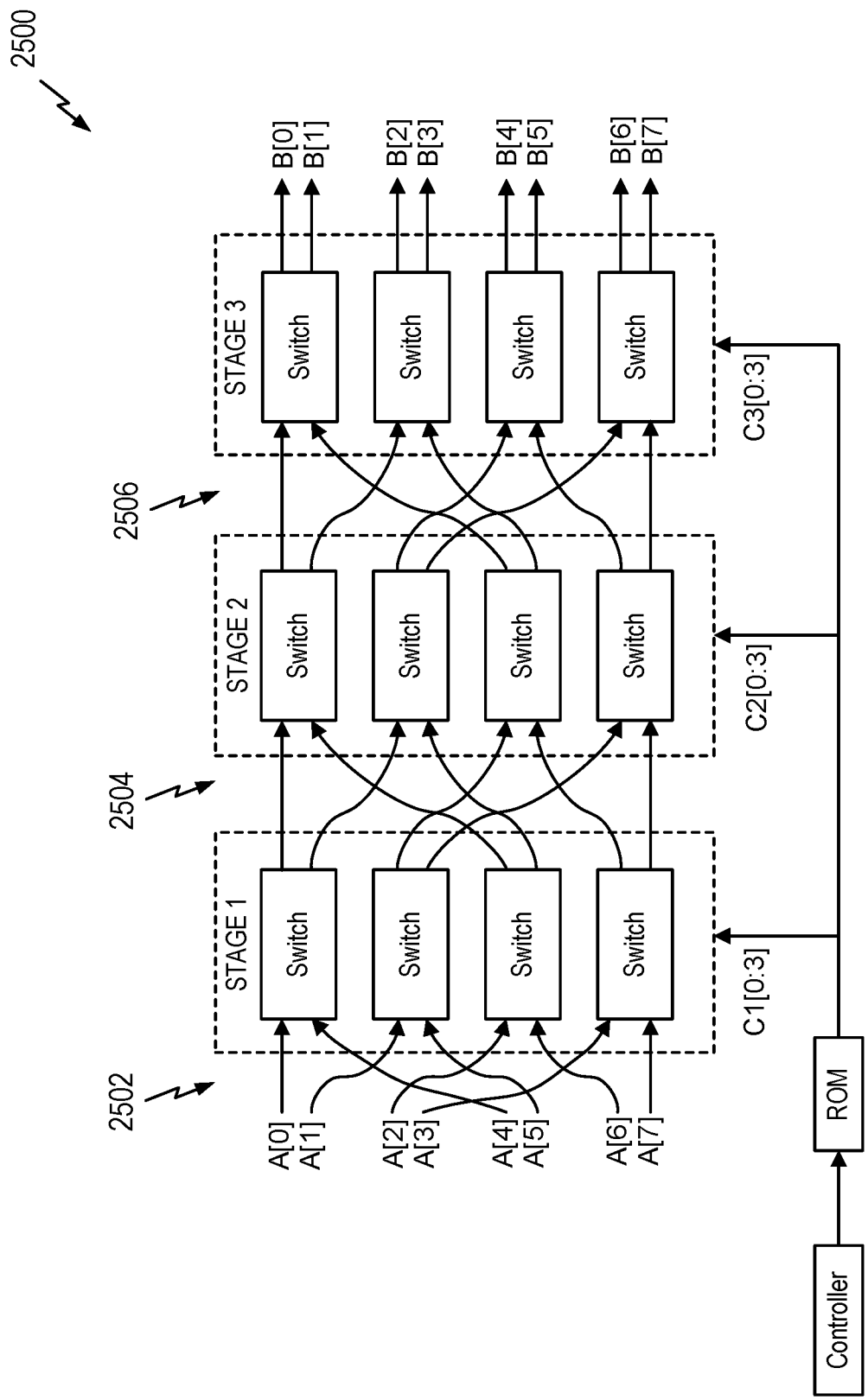
FIG. 25 shows a block diagram of a modified Omega MIN that can be used to perform local interleaving in accordance with one embodiment of the disclosure.

FIG. 25 shows a block diagram of a modified (8×8) Omega MIN 2500 that can be used to perform local interleaving in accordance with one embodiment of the disclosure. In general, Omega networks are (N×N) multistage interconnection networks that are sized according to integer powers of two. Thus, Omega networks have sizes of N=2, 4, 8, 16, 32, 64, 128, etc. Further, the number L of stages in an Omega network is equal to log 2(N) and the number of (2×2) switches per stage is equal to N/2.

Omega network 2500 is an (8×8) network that receives eight input values at eight input terminals A[0:7] and maps the eight input values to eight output terminals B[0:7]. Each input value may be any suitable value such as a single bit, a plurality of bits, a sample, or a soft value (such as a Viterbi log-likelihood ratio (LLR) value) having a hard-decision bit and at least one confidence-value bit. The eight input values are mapped to the eight output terminals using log 2(8)=3 configurable stages i, where i=1, 2, 3, each of which comprises 8/2=4 (2×2) switches.

Each stage i receives the eight input values from the previous stage, or from input terminals A[0:7] in the case of stage 1, via a fixed interconnection system (e.g., 2502, 2504, and 2506) that implements a perfect shuffle on the eight input values. A perfect shuffle is a process equivalent to (i) dividing a deck of cards into two equal piles, and (ii) shuffling the two equal piles together in alternating fashion such that the cards in the first pile alternate with the cards from the second pile.

For example, stage 1 receives eight inputs values from input terminals A[0:7] via fixed interconnection system 2502. Fixed interconnection system 2502 performs a perfect shuffle on the eight input values by dividing the eight input values received at input terminals A[0:7] into a first set corresponding to input terminals A[0:3] and a second set corresponding to input terminals A[4:7]. Similarly, fixed interconnection system 2504 performs a perfect shuffle on the outputs of switches from stage 1 and provides the shuffled outputs to the switches of stage 2, and fixed interconnection system 2506 performs a perfect shuffle on the outputs of the switches of stage 2 and provides the shuffled outputs to the switches of stage 3.

In addition to receiving eight input values, each configurable stage i receives a four-bit control signal Ci[0:3] from control signal memory (e.g., ROM), wherein each bit of the four-bit control signal configures a different one of the four 2×2 switches in the stage. Thus, the switches of stage 1 are configured based on the values of control bits C1[0], C1[1], C1[2], and C1[3], the switches of stage 2 are configured based on the values of control bits C2[0], C2[1], C2[2], and C2[3], and the switches of stage 3 are configured based on the values of control bits C3[0], C3[1], C3[2], and C3[3].

Setting a control bit to a value of one configures the corresponding switch as a crossed connection such that (i) the value received at the upper input is provided to the lower output and (ii) the value received at the lower input is provided to the upper output. Setting a control bit to a value of zero configures the corresponding switch as a straight pass-through connection such that (i) the value received at the upper input is provided to the upper output and (ii) the value received at the lower input is provided to the lower output.

In signal-processing applications, multistage interconnection networks, such as Omega network 2500, are often used for routing purposes to connect processors on one end of the network to memory elements on the other end. However, multistage interconnection networks may also be used in signal-processing applications for other purposes, such as for permutating or interleaving a contiguous data stream.

FIG. 25 illustrates one implementation of a suitable Omega MIN configured for interleaving. In other embodiments, other implementations of a suitable Omega MIN can be used.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A method for determining a physical block address (PBA) of a non-volatile memory (NVM) to enable a data access of a corresponding logical block address (LBA), the method comprising:
    generating a first physical block address (PBA) candidate within a physical block address (PBA) map from a LBA using a first function and a first cumulative control state;
    generating a second physical block address (PBA) candidate within the PBA map from the LBA using a second function and a second cumulative control state; and
    selecting either the first PBA candidate or the second PBA candidate for the data access based on information related to a background swap of data stored at the first PBA candidate and a background swap of data stored at the second PBA candidate, wherein the selecting comprises:
        determining a position of the second PBA candidate relative to a midpoint of all entries in the PBA map;
        determining a PBA move counter based on the position of the second PBA candidate;
        comparing the PBA move counter to a move index indicative of a current position of PBA swaps within the PBA map; and
        selecting either the first PBA candidate or the second PBA candidate based on the comparison of the PBA move counter and the move index.

2. The method of claim 1, further comprising accessing data stored at the selected PBA candidate via the LBA.

3. The method of claim 1, wherein the data access is one of a read access or a write access.

4. The method of claim 1, wherein the information related to the background swap of data stored at the first PBA candidate and the background swap of data stored at the second PBA candidate comprises a status of the background swap of data stored at the first PBA candidate and a status of the background swap of data stored at the second PBA candidate.

5. The method of claim 1, further comprising:
    mapping a portion of a physical address space containing the selected PBA candidate to another portion of the physical address space using at least one of a background data move or a background data swap.

6. The method of claim 1:
    wherein the selecting either the first PBA candidate or the second PBA candidate comprises selecting either the first PBA candidate or the second PBA candidate using a memory table.

7. The method of claim 1, wherein at least one of the first function or the second function comprises a function performed by at least one of a multi-stage interconnection network or a block cipher.

8. The method of claim 7, wherein the multi-stage interconnection network comprises at least one of a Benes network, an inverse Benes network, a Bitonic network, an inverse Bitonic network, an Omega network, an inverse Omega network, a Butterfly network, or an inverse Butterfly network.

9. The method of claim 1, wherein the determining the PBA move counter based on the position of the second PBA candidate comprises assigning the PBA move counter to the value of the second PBA candidate.

10. The method of claim 1, wherein the determining the PBA move counter based on the position of the second PBA candidate comprises assigning the PBA move counter to the value of the first PBA candidate.

11. The method of claim 1, wherein the selecting either the first PBA candidate or the second PBA candidate based on the comparison of the PBA move counter and the move index comprises selecting the first PBA candidate.

12. The method of claim 1, wherein the selecting either the first PBA candidate or the second PBA candidate based on the comparison of the PBA move counter and the move index comprises selecting the second PBA candidate.

13. A system for determining a physical block address (PBA) of a non-volatile memory (NVM) to enable a data access of a corresponding logical block address (LBA), the system comprising:
a first network configured to generate a first PBA candidate from a LBA using a first function;
a second network configured to generate a second PBA candidate from the LBA using a second function; and
a select logic configured to select either the first PBA candidate or the second PBA candidate for the data access based on information related to a background swap of data stored at the first PBA candidate and a background swap of data stored at the second PBA candidate, the information comprising a status of the background swap of data stored at the first PBA candidate and a status of the background swap of data stored at the second PBA candidate;
wherein the first PBA candidate and the second PBA candidate are within a PBA map; and
wherein the status of the background swap of data stored at the second PBA candidate comprises a position of the second PBA candidate relative to a midpoint of all entries in the PBA map, a PBA move counter based on the position of the second PBA candidate, and a move index indicative of a current position of PBA swaps within the PBA map.

14. The system of claim 13, further comprising a processor configured to access data stored at the selected PBA candidate via the LBA.

15. The system of claim 13, wherein the data access is one of a read access or a write access.

16. The system of claim 13, further comprising a mapper configured to map a portion of a physical address space containing the selected PBA candidate to another portion of the physical address space using at least one of a background data move or a background data swap.

17. The system of claim 13, where the select logic is configured to select the first PBA or the second PBA using a memory table.

18. The system of claim 13, wherein the first network includes at least one of a multi-stage interconnection network or a block cipher network.

19. The system of claim 18, wherein the multi-stage interconnection network comprises at least one of a Benes network, an inverse Benes network, a Bitonic network, an inverse Bitonic network, an Omega network, an inverse Omega network, a Butterfly network, or an inverse Butterfly network.

20. The system of claim 13:
wherein the first network is configured to generate the first PBA candidate within the PBA map from the LBA using the first function and a first cumulative control state;
wherein the second network is configured to generate the second PBA candidate within the PBA map from the LBA using the second function and a second cumulative control state;
wherein the select logic is configured to:
determine a position of the second PBA candidate relative to a midpoint of all entries in the PBA map;
determine a PBA move counter based on the position of the second PBA candidate;
compare the PBA move counter to a move index indicative of a current position of PBA swaps within the PBA map; and
select either the first PBA candidate or the second PBA candidate based on the comparison of the PBA move counter and the move index.

21. The system of claim 20, wherein the select logic is configured to assign the PBA move counter to the value of the second PBA candidate.

22. The system of claim 20, wherein the select logic is configured to assign the PBA move counter to the value of the first PBA candidate.

23. The system of claim 20, wherein the select logic is configured to select the first PBA candidate.

24. The system of claim 20, wherein the select logic is configured to select the second PBA candidate.

25. The system of claim 13:
wherein the first network is configured to generate the first PBA candidate within the PBA map from the LBA using the first function and a first cumulative control state;
wherein the second network is configured to generate the second PBA candidate within the PBA map from the LBA using the second function and a second cumulative control state;
wherein the select logic is configured to:
determine a position of the first PBA candidate relative to a midpoint of all entries in the PBA map;
determine a PBA move counter based on the position of the first PBA candidate;
compare the PBA move counter to a move index indicative of a current position of PBA swaps within the PBA map; and
select either the first PBA candidate or the second PBA candidate based on the comparison of the PBA move counter and the move index.

26. A system for determining a physical block address (PBA) of a non-volatile memory (NVM) to enable a data access of a corresponding logical block address (LBA), the system comprising:
means for generating a first PBA candidate within a physical block address (PBA) map from a LBA using a first function and a first cumulative control state;

means for generating a second PBA candidate within the PBA map from the LBA using a second function and a second cumulative control state; and means for selecting either the first PBA candidate or the second PBA candidate for the data access based on information related to a background swap of data stored at the first PBA candidate and a background swap of data stored at the second PBA candidate, the means for selecting comprising:

means for determining a position of the second PBA candidate relative to a midpoint of all entries in the PBA map;

means for determining a PBA move counter based on the position of the second PBA candidate;

means for comparing the PBA move counter to a move index indicative of a current position of PBA swaps within the PBA map; and means for selecting either the first PBA candidate or the second PBA candidate based on the comparison of the PBA move counter and the move index.

* * * * *